US011710137B2

(12) United States Patent
Pavlov et al.

(10) Patent No.: US 11,710,137 B2
(45) Date of Patent: Jul. 25, 2023

(54) METHOD AND SYSTEM FOR IDENTIFYING ELECTRONIC DEVICES OF GENUINE CUSTOMERS OF ORGANIZATIONS

(71) Applicant: YANDEX EUROPE AG, Lucerne (CH)

(72) Inventors: Georgy Eduardovich Pavlov, Cheboksary (RU); Aleksandr Borisovich Baranov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 301 days.

(21) Appl. No.: 16/869,828

(22) Filed: May 8, 2020

(65) Prior Publication Data
US 2021/0056561 A1 Feb. 25, 2021

(30) Foreign Application Priority Data
Aug. 23, 2019 (RU) .......................... RU2019126743

(51) Int. Cl.
*G06Q 30/0282* (2023.01)
*G06Q 30/018* (2023.01)
(Continued)

(52) U.S. Cl.
CPC ..... *G06Q 30/0185* (2013.01); *G06F 16/9566* (2019.01); *G06Q 30/0282* (2013.01);
(Continued)

(58) Field of Classification Search
CPC ........... G06Q 30/0185; G06Q 30/0282; G06Q 30/00; G06Q 30/02; G06Q 30/018;
(Continued)

(56) References Cited

U.S. PATENT DOCUMENTS 5,467,006 A 11/1995 Sims
7,519,562 B1 4/2009 Vander et al.
(Continued)

FOREIGN PATENT DOCUMENTS

CN 103853744 A 6/2014
RU 2378692 C2 1/2010
(Continued)

OTHER PUBLICATIONS

Kristopher Craw, "Using Word2Vec to Classify Review Keywords", Oct. 13, 2017 (Year: 2017).*
(Continued)

*Primary Examiner* — Sangeeta Bahl
*Assistant Examiner* — Ivonnemary Rivera Gonzalez
(74) *Attorney, Agent, or Firm* — BCF LLP

(57) ABSTRACT

A computer-implemented method for identifying, among user electronic devices, customer electronic devices associated with genuine customers of organizations, the method being executed by a server, the method comprising: receiving, from a first user electronic device by the server, a first uniform resource locator (URL) of a first user browsing history; generating a first embedding corresponding to the first URL; comparing the first embedding with a template embedding of a plurality of template embeddings, the plurality of template embeddings having been retrieved from a genuity database; and in response to a difference between the first embedding and the template embedding being lower than an embedding difference threshold, adding the first embedding to the genuity database.

14 Claims, 10 Drawing Sheets

(51) Int. Cl.
*H04L 9/40* (2022.01)
*G06F 16/955* (2019.01)
*G06Q 30/0601* (2023.01)
*H04L 67/50* (2022.01)

(52) U.S. Cl.
CPC ....... *G06Q 30/0609* (2013.01); *H04L 63/126* (2013.01); *H04L 67/535* (2022.05)

(58) Field of Classification Search
CPC ........... G06Q 30/0213; G06Q 30/0224; G06Q 30/0225; G06Q 30/0241; G06Q 30/0248; G06Q 30/06; G06Q 30/0601; G06Q 30/0631; G06Q 30/0641; G06Q 20/40; G06Q 20/38; G06Q 20/00; G06Q 20/4014; G06Q 20/4016; G06Q 30/0609; G06Q 30/0201; G06Q 30/04; G06F 16/9566; G06F 16/955; G06F 16/95; G06F 16/90; G06F 16/00; H04L 63/126; H04L 67/22; H04L 63/08; H04L 63/12; H04L 63/00; H04L 67/00; H04L 67/535
See application file for complete search history.

(56) References Cited

U.S. PATENT DOCUMENTS

| | | | |
|---|---|---|---|
| 7,610,276 B2 | 10/2009 | Yomtobian | |
| 7,827,054 B2 | 11/2010 | Campbell et al. | |
| 7,877,800 B1 | 1/2011 | Satish et al. | |
| 8,578,462 B2 | 11/2013 | Petrovic | |
| 8,661,299 B1 | 2/2014 | Ip | |
| 8,966,631 B2 | 2/2015 | El-Moussa et al. | |
| 9,047,628 B2 | 6/2015 | Mislove et al. | |
| 9,092,510 B1 | 7/2015 | Stets et al. | |
| 9,098,459 B2 | 8/2015 | Davis et al. | |
| 9,183,387 B1 | 11/2015 | Altman et al. | |
| 9,241,010 B1 | 1/2016 | Bennett et al. | |
| 9,349,134 B1 | 5/2016 | Adams et al. | |
| 9,479,516 B2 | 10/2016 | Mote et al. | |
| 9,652,354 B2 | 5/2017 | Filimonov et al. | |
| 9,672,242 B2 | 6/2017 | Jung et al. | |
| 9,846,896 B2 | 12/2017 | Shah et al. | |
| 9,866,566 B2 | 1/2018 | Dulkin et al. | |
| 9,870,596 B2 | 1/2018 | Babinowich et al. | |
| 10,009,358 B1 | 6/2018 | Xie et al. | |
| 10,084,816 B2 | 9/2018 | Zhang et al. | |
| 10,089,660 B2 | 10/2018 | Luan et al. | |
| 10,218,733 B1 | 2/2019 | Amidon et al. | |
| 10,348,767 B1 | 7/2019 | Lee et al. | |
| 10,362,057 B1 | 7/2019 | Wu | |
| 10,565,372 B1 | 2/2020 | Stickle et al. | |
| 2004/0260922 A1 | 12/2004 | Goodman et al. | |
| 2005/0262026 A1 | 11/2005 | Watkins et al. | |
| 2008/0162475 A1 | 7/2008 | Meggs et al. | |
| 2008/0172271 A1 | 7/2008 | Wee et al. | |
| 2008/0301090 A1 | 12/2008 | Sadagopan et al. | |
| 2008/0301811 A1 | 12/2008 | Jung | |
| 2009/0049547 A1 | 2/2009 | Fan | |
| 2009/0083184 A1 | 3/2009 | Eisen et al. | |
| 2009/0249480 A1 | 10/2009 | Osipkov et al. | |
| 2010/0262688 A1 | 10/2010 | Hussain et al. | |
| 2011/0055104 A1 | 3/2011 | Sun et al. | |
| 2011/0208714 A1 | 8/2011 | Soukal et al. | |
| 2012/0233692 A1 | 10/2012 | Oh et al. | |
| 2013/0246302 A1* | 9/2013 | Black | G06Q 30/0282 705/347 |
| 2013/0332468 A1 | 12/2013 | Hardas et al. | |
| 2014/0114877 A1* | 4/2014 | Montano | G06Q 10/06398 705/347 |
| 2014/0214570 A1 | 7/2014 | Smolev et al. | |
| 2014/0258169 A1* | 9/2014 | Wong | G06Q 30/0282 705/347 |
| 2015/0095417 A1* | 4/2015 | Chetuparambil | G06Q 50/01 709/204 |
| 2015/0205862 A1 | 7/2015 | Campagne et al. | |
| 2015/0264073 A1 | 9/2015 | Tavakoli et al. | |
| 2015/0326674 A1 | 11/2015 | Kruglick et al. | |
| 2015/0332353 A1* | 11/2015 | Chauhan | G06Q 30/02 705/347 |
| 2015/0341383 A1 | 11/2015 | Reddy et al. | |
| 2016/0065600 A1 | 3/2016 | Lee et al. | |
| 2016/0196566 A1 | 7/2016 | Murali et al. | |
| 2016/0259742 A1 | 9/2016 | Faulkner et al. | |
| 2016/0294775 A1 | 10/2016 | Mahadik et al. | |
| 2016/0321711 A1 | 11/2016 | Wouhaybi et al. | |
| 2017/0171186 A1 | 6/2017 | Purushothaman et al. | |
| 2017/0220971 A1 | 8/2017 | Giammaria et al. | |
| 2017/0221111 A1 | 8/2017 | Salehi et al. | |
| 2017/0230229 A1 | 8/2017 | Sasturkar et al. | |
| 2017/0272458 A1 | 9/2017 | Muddu et al. | |
| 2017/0288955 A1 | 10/2017 | Yin | |
| 2018/0048658 A1 | 2/2018 | Hittel et al. | |
| 2018/0114261 A1* | 4/2018 | Jayachandran | G06Q 30/0623 |
| 2018/0124095 A1 | 5/2018 | Hamdi | |
| 2018/0196684 A1 | 7/2018 | Pengfei et al. | |
| 2018/0218295 A1 | 8/2018 | Hasija et al. | |
| 2018/0278647 A1 | 9/2018 | Gabaev et al. | |
| 2018/0357683 A1 | 12/2018 | Pickover et al. | |
| 2019/0034986 A1 | 1/2019 | Robinson et al. | |
| 2019/0064752 A1 | 2/2019 | Marwah et al. | |
| 2019/0379700 A1 | 12/2019 | Canzanese et al. | |
| 2020/0012981 A1 | 1/2020 | Davison et al. | |
| 2020/0098018 A1* | 3/2020 | Narula | G06F 16/285 |
| 2020/0311309 A1 | 10/2020 | Dawer et al. | |
| 2020/0342006 A1 | 10/2020 | Rossi et al. | |
| 2021/0271727 A1* | 9/2021 | Fan | H04L 67/02 |

FOREIGN PATENT DOCUMENTS

| | | |
|---|---|---|
| WO | 2018222797 A1 | 12/2018 |
| WO | 2019013771 A1 | 1/2019 |

OTHER PUBLICATIONS

Jespersen, "Online reviews: How to figure out which are real and which are fake", (Apr. 26, 2019) (Year: 2019).*

McCabe, "9 Ways to Spot a Fake Review (+How Amazon is Fighting Back)", (Mar. 1, 2019) (Year: 2019).*

"Search Engine Click Spam Detection Based on Bipartite Graph Propagation" http://www.thuir.cn/group/~YQLiu/publications/wsdm2014.pdf, published in WSDM '14 Proceedings of the 7th ACM international conference on Web search and data mining on Feb. 24, 2014, retrieved on Oct. 9, 2019.

Walgampaya "Cracking the Smart ClickBot", Conference: 13th IEEE International Symposium on Web Systems Evolution, WSE 2011, Williamsburg, VA, USA, Sep. 30, 2011 Cite this publication, Doi: 10.1109/WSE.2011.6081830 , retrieved on Oct. 9, 2019.

Yafeng "Positive Unlabeled Learning for Deceptive Reviews Detection", Wuhan University, published in Proceedings of the 2014 Conference on Empirical Methods in Natural Language Processing (EMNLP), retrieved on Oct. 9, 2019.

Notice of Allowance dated Apr. 2, 2021 received in respect of a related U.S. Appl. No. 16/868,363.

Notice of Allowance with regard to the counterpart U.S. Appl. No. 16/911,503 dated Feb. 24, 2022.

Russian Search Report dated Oct. 29, 2021 issued in respect of the counterpart Russian Patent Application No. RU 2019126743.

Office Action dated May 13, 2021 received in respect of a related U.S. Appl. No. 16/869,878.

Notice of Allowance dated Jun. 24, 2021 received in respect of a related U.S. Appl. No. 16/869,282.

* cited by examiner

METHOD AND SYSTEM FOR IDENTIFYING ELECTRONIC DEVICES OF GENUINE CUSTOMERS OF ORGANIZATIONS

CROSS-REFERENCE

The present application claims priority to Russian Patent Application No. 2019126743, entitled "Method and System for Identifying Electronic Devices of Genuine Customers of Organizations", filed Aug. 23, 2019, the entirety of which is incorporated herein by reference.

FIELD

The present technology relates to anti-fraud methods and systems and in particular to a method and a system for identifying electronic devices of genuine customers of organizations.

BACKGROUND

User-generated recommendation platforms provide user-generated rankings and reviews of various organizations, their products and services. The recommendation platforms are frequently consulted by customers before making a purchase decision. However, some users are being paid for providing comments and ranking up or down the organizations on purpose, even though they did not buy anything from those organizations or otherwise interacted with the services of the organization. Such behaviour considerably distorts the rankings and misleads the future customers who look for genuine reviews and rankings on the recommendation platforms.

In order to prevent the fraud and to ensure that the rankings are truthful, the user who provided the recommendation of an organization needs to be a genuine customer of that organization. Therefore, the genuity of customers has to be confirmed. Currently known technology verifies user's credit card information and his or her geo location. The data provided by the user is compared with the data available from the credit card services. However, such technology requires requesting credit card companies for information or otherwise having access to financial data of users of electronic devices, which in turn may cause privacy or other concerns.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Embodiments of the present technology have been developed based on developers' appreciation that a transaction confirmation page of different organizations may have similar and recognizable patterns because many websites are created using the same template from a content management system (CMS). In order to identify whether the user has visited the transaction confirmation page, the main repeatable uniform resource locator (URL) patterns and/or masks may be identified in the browsing history of the user electronic device.

In accordance with a first broad aspect of the present technology, there is provided a computer-implemented method for identifying, among user electronic devices, customer electronic devices associated with genuine customers of organizations, the method being executed by a server. The method comprises: receiving, from a first user electronic device by the server, a first uniform resource locator (URL) of a first user browsing history; generating a first embedding corresponding to the first URL; comparing the first embedding with a template embedding of a plurality of template embeddings, the plurality of template embeddings having been retrieved from a genuity database; and, in response to a difference between the first embedding and the template embedding being lower than an embedding difference threshold, adding the first embedding to the genuity database.

In some non-limiting embodiments of the method, the method further comprises, in response to the difference between the first embedding and the template embedding being lower than the embedding difference threshold: marking the first user electronic device as being a first customer electronic device associated with a first genuine customer of a first organization; and causing displaying of a first review received from the first user electronic device on displays of future customers' electronic devices.

In some non-limiting embodiments of the method, the method further comprises generating the genuity database by: receiving, by the server, a plurality of template transaction confirmation page URLs of genuity confirmation pages of corresponding template organizations; and for each template transaction confirmation page URL of the template transaction confirmation page URLs, generating a new template embedding and storing the new template embedding in the genuity database, the new template embedding being one of the plurality of template embeddings.

In some non-limiting embodiments of the method, at least one of the genuity confirmation pages is an online purchase confirmation page indicative of completion of a purchase by a genuine customer.

In some non-limiting embodiments of the method, the method further comprises, in response to the difference between the first embedding and the first template embedding being lower than the embedding difference threshold: associating the first embedding with a template URL pattern.

In some non-limiting embodiments of the method, the method further comprises, in response to the difference between the first embedding and the first template embedding being lower than the embedding difference threshold: generating a first URL pattern for the first URL; and adding the first URL pattern to the genuity database.

In some non-limiting embodiments of the method, the generating the first URL pattern comprises a first dynamic portion of the first URL and a first static portion of the first URL. The generating the first URL pattern may comprise identifying at least one mask of a first pattern dynamic portion of the first URL pattern and identifying a first pattern static portion of the first URL pattern.

In some non-limiting embodiments of the method, the method may further comprise: receiving, from a second user electronic device by the server, a second URL; comparing the second URL with the first URL pattern; and in response to the second URL matching the first URL pattern: marking the second user electronic device as being a second customer electronic device associated with a second genuine customer of a second organization, and causing displaying of a second review of the second organization received from the second user electronic device on displays of future customers' electronic devices.

In some non-limiting embodiments of the method, the method may further comprise: in response to the second URL being different from the first URL pattern: accessing a recommendation database; and executing one of: (i) marking the second review associated with the second organization and received from the second user electronic device as being fraudulent; and (ii) deleting the second review associated with the second organization and received from the second user electronic device from the recommendation database; and in response to the second pattern static portion being different from the first pattern static portion: generating a second embedding corresponding to the second URL; comparing the second embedding with a third embedding, the third embedding being one of the plurality of template embeddings; and in response to a difference between the second embedding and the third embedding being lower than the embedding difference threshold: adding the second embedding to the genuity database.

In some non-limiting embodiments of the method, the method may further comprise: receiving, from a second user electronic device by the server, a second URL; generating a second embedding corresponding to the second URL; comparing the second embedding with the first embedding; and in response to a difference between the second embedding and the first embedding being lower than the embedding difference threshold: adding the second embedding to the genuity database.

In at least one embodiment, the difference between the first embedding and the template embedding being lower than the embedding difference threshold is indicative of the first URL and the template URL having at least partially common URL pattern. In at least one embodiment, the generating the first embedding comprises applying a Word2Vector algorithm to the first URL.

The method may further comprise: in response to the difference between the first embedding and the template embedding being lower than the embedding difference threshold: accessing a recommendation database, and marking reviews associated with a first organization and received from the first electronic device as being genuine comments. The method may further comprise: in response to the difference between the first embedding and the template embedding being lower than the embedding difference threshold, discarding, from the recommendation database, a subset of reviews not associated with a plurality of genuine customer electronic devices.

The method may further comprise: in response to the difference between the first embedding and the template embedding being equal or higher than the embedding difference threshold: accessing a recommendation database; and executing one of: (i) marking reviews associated with a first organization and received from the first user electronic device as being fraudulent; and (ii) deleting the reviews associated with the first organization and received from the first user electronic device from the recommendation database.

In some non-limiting embodiments of the method, the method may further comprise: prior to receiving the first URL, requesting the first user electronic device to provide the first URL of the first user browsing history. The method may further comprise: in response to the difference between the first embedding and the template embedding being lower than the embedding difference threshold, and prior to causing displaying of the first review: sending a review request to the first genuine customer electronic device requesting to provide comments on the first organization, the review request being configured to be displayed on a display of the first genuine customer electronic device. The first organization may be at least one of an online store, a booking service, and a service provider.

In accordance with another broad aspect of the present technology, there is provided a computer-implemented system for identifying, among user electronic devices, customer electronic devices associated with genuine customers of organizations. The system comprises: a genuity database; and a server configured to: receive, from a first user electronic device by the server, a first uniform resource locator (URL) of a first user browsing history; generate a first embedding corresponding to the first URL; compare the first embedding with a template embedding of a plurality of template embeddings, the plurality of template embeddings having been retrieved from a genuity database; and, in response to a difference between the first embedding and the template embedding being lower than an embedding difference threshold, adding the first embedding to the genuity database.

In some non-limiting embodiments of the system, the server is further configured to: in response to the difference between the first embedding and the template embedding being lower than the embedding difference threshold: mark the first user electronic device as being a first customer electronic device associated with a first genuine customer of a first organization; and cause displaying of a first review received from the first user electronic device on displays of future customers' electronic devices.

In some non-limiting embodiments of the system, the genuity database is generated by: receiving, by the server, a plurality of template transaction confirmation page URLs of genuity confirmation pages of corresponding template organizations; and for each template transaction confirmation page URL of the template transaction confirmation page URLs, generating a template embedding and storing the template embedding in the genuity database, the template embedding being one of the plurality of template embeddings.

In some non-limiting embodiments of the system, the server is further configured to, in response to the difference between the first embedding and the first template embedding being lower than the embedding difference threshold: associate the first embedding with a template URL pattern, the template URL pattern being associated with the template embedding.

In some non-limiting embodiments of the system, the server is further configured to, in response to the difference between the first embedding and the first template embedding being lower than the embedding difference threshold: generate the first URL pattern for the first URL; and compare the first URL pattern with a template URL pattern stored in the genuity database.

In some non-limiting embodiments of the system, the server is further configured to identify a first static portion of the first URL, a first pattern static portion corresponding to the first static portion, and a first dynamic portion of the first URL.

In some non-limiting embodiments of the system, the server is further configured to: identify a first mask of the first URL pattern to generate the first URL pattern; and compare the first mask with a template mask of the template URL pattern in order to compare the first URL pattern with the template URL pattern comprises.

In some non-limiting embodiments of the system, the server is further configured to: in response to the first pattern static portion being different from a template pattern static portion of the template URL pattern: add the first URL pattern to the genuity database, mark the first user electronic device as being a first customer electronic device associated with a first genuine customer of a first organization, and cause displaying of a first review received from the first user electronic device on displays of future customers' electronic devices; in response to the first pattern static portion matching the template pattern static portion and in response to the first URL pattern matching the template URL pattern: mark the first user electronic device as being a first customer electronic device associated with a first genuine customer of a first organization, and cause displaying of a first review received from the first user electronic device on displays of future customers' electronic devices.

In some non-limiting embodiments of the system, the server is further configured to: in response to the first pattern static portion matching the template pattern static portion and in response to the first URL pattern being different from the template URL pattern: access a recommendation database; and executing one of: (i) mark a first review, received from the first user electronic device and associated with a first organization associated with the first URL, as being fraudulent; and (ii) delete the first review associated with the first organization and received from the first user electronic device from the recommendation database.

In some non-limiting embodiments of the system, the server is further configured to: receive, from a second user electronic device by the server, a second URL; generate a second URL pattern corresponding to the second URL by identifying a second pattern static portion and a second pattern dynamic portion of the second URL; in response to the second pattern static portion matching the first pattern static portion and in response to the second URL pattern matching the first URL pattern: mark the second user electronic device as being a second customer electronic device associated with a second genuine customer of the first organization, and cause displaying of a second review of the first organization received from the second user electronic device on displays of future customers' electronic devices.

In some non-limiting embodiments of the system, the server is further configured to: in response to the second pattern static portion matching the first pattern static portion and the second URL pattern being different from the first URL pattern: access a recommendation database; and executing one of: (i) mark the second review associated with the first organization and received from the second user electronic device as being fraudulent; and (ii) delete the second review associated with the first organization and received from the second user electronic device from the recommendation database; and in response to the second pattern static portion being different from the first pattern static portion: generate a second embedding corresponding to the second URL; compare the second embedding with a third embedding, the third embedding being one of the plurality of template embeddings; and in response to a difference between the second embedding and the third embedding being lower than the embedding difference threshold: add the second embedding to the genuity database.

In some non-limiting embodiments of the system, the server is further configured to: receive, from a second user electronic device by the server, a second URL; generate a second embedding corresponding to the second URL; compare the second embedding with the first embedding; and in response to a difference between the second embedding and the first embedding being lower than the embedding difference threshold: add the second embedding to the genuity database.

In some non-limiting embodiments of the system, the difference between the first embedding and the template embedding being lower than the embedding difference threshold is indicative of the first URL and the template URL having at least partially common URL pattern.

In some non-limiting embodiments of the system, the server is further configured to generate the first embedding by applying a Word2Vector algorithm to the first URL.

In some non-limiting embodiments of the system, in response to the difference between the first embedding and the template embedding being lower than the embedding difference threshold, the server is further configured to: access a recommendation database and mark reviews associated with a first organization and received from the first electronic device as being genuine comments.

In some non-limiting embodiments of the system, the server is further configured to, in response to the difference between the first embedding and the template embedding being lower than the embedding difference threshold, discard, from the recommendation database, a subset of comments not associated with a plurality of genuine customer electronic devices.

In some non-limiting embodiments of the system, in response to the difference between the first embedding and the template embedding being equal or higher than the embedding difference threshold, the server is further configured to: access a recommendation database; and execute one of: (i) mark reviews associated with a first organization and received from the first user electronic device as being fraudulent; and (ii) delete the comments associated with the first organization and received from the first user electronic device from the recommendation database.

In some non-limiting embodiments of the system, in response to the difference between the first embedding and the template embedding being lower than the embedding difference threshold, and prior to causing displaying of the first review, the server is further configured to: send a review request to the first genuine customer electronic device requesting to provide comments on the first organization, the review request being configured to be displayed on a display of the first genuine customer electronic device.

As referred to herein, the reviews (also referred to herein as "comments"), solicited from and provided by the user on the recommendation platform, comprise, without limitation, reviews/comments (including neutral, positive and/or negative), rankings and/or recommendations. By way of an example, the ranking may include a number of points and/or stars (e.g. 4 out of 5 or 8 out of 10). In some embodiments, the reviews may include text and/or images. The reviews may be provided for the corresponding organization itself, merchandize, services, etc.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2 depicts a non-limiting example of a screenshot of an e-commerce page of an e-commerce platform, in accordance with non-limiting embodiments of the present technology;

FIG. 3 depicts a non-limiting example of a screenshot of a reviews page, in accordance with non-limiting embodiments of the present technology;

Figure 1:
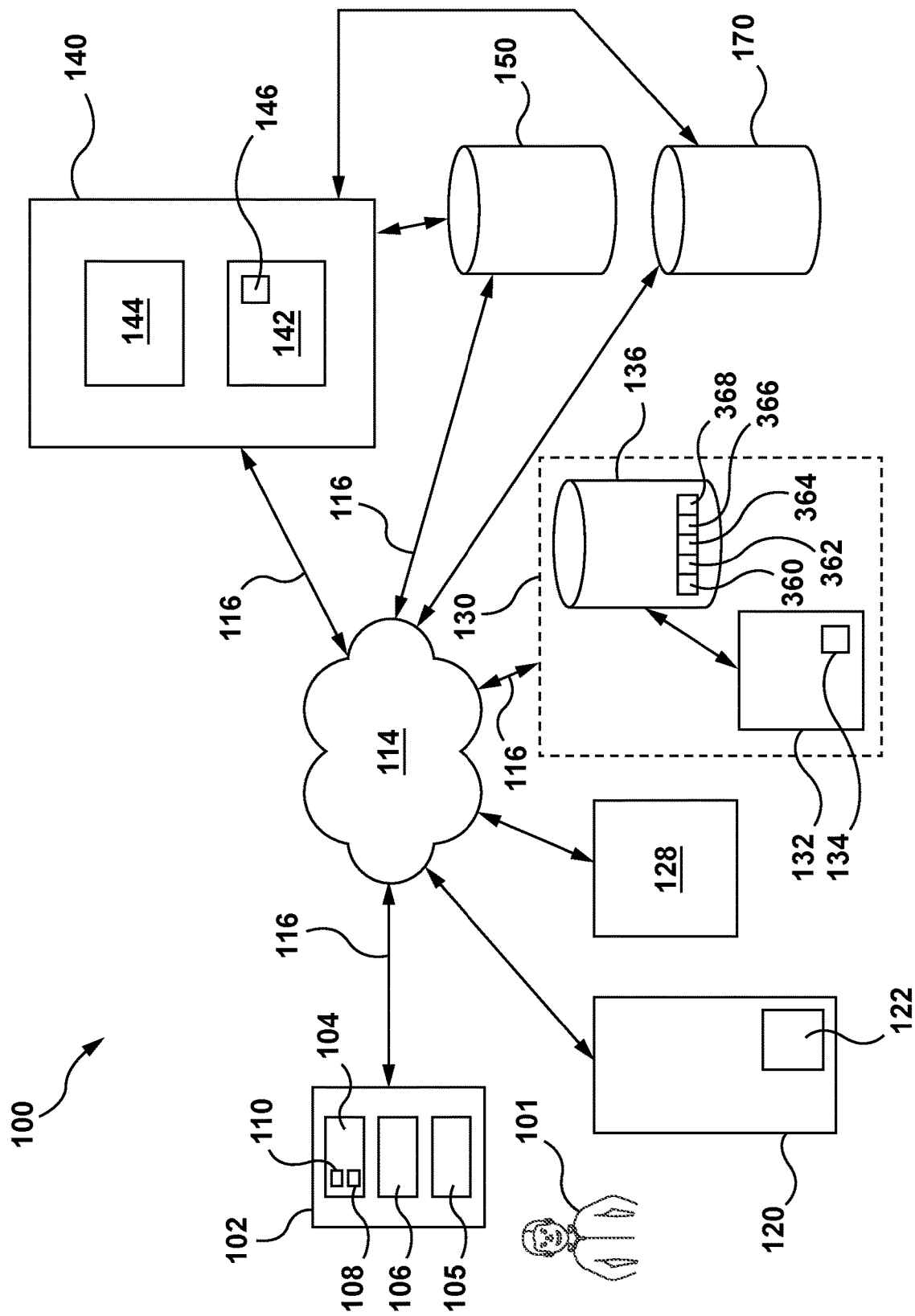
FIG. 1 depicts a schematic diagram of a system implemented in accordance with non-limiting embodiments of the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION OF THE NON-LIMITING EMBODIMENTS

Referring to FIG. 1, there is depicted a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user 101 and, as such, can sometimes be referred to as a "user electronic device". It should be noted that the fact that the electronic device 102 is associated with the user 101 does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets.

Referring again to FIG. 1, the electronic device 102 comprises a user device permanent storage 104. The user device permanent storage 104 may encompass one or more storage media and generally provides a place to store computer-executable instructions executable by a user processor 106. By way of an example, the user device permanent storage 104 may be implemented as a computer-readable storage medium including Read-Only Memory (ROM), hard disk drives (HDDs), solid-state drives (SSDs), and flash-memory cards.

The electronic device 102 also comprises hardware and/or software and/or firmware (or a combination thereof) to execute one or more browsing applications 108. Generally speaking, the browsing application 108 corresponds to electronic applications accessible by the electronic device 102 and configured to provide access to various web pages. For example, the one or more browsing applications 108 may include a web browsing application Yandex.Browser™, Internet Explorer™ browser, Firefox™ browser a market application Yandex.Market™, Firefox™ browsing application for Android™ mobile operating system and the like.

Uniform resource locators (URLs) of websites visited by the user electronic device's browsing application 108 are stored in a user browsing history 110 on the user device permanent storage 104. The user browsing history 110 may comprise URLs of websites visited by one or more browsing applications on one or more user electronic devices 102. It should be noted that the user browsing history 110 may be physically located on the electronic device 102 or elsewhere. For example, the user browsing history 110 may be at least partially located in an online storage such as Yandex-.Cloud™ storage and the like. In some non-limiting embodiments, the user browsing history 110 may comprise URLs of websites visited by the user 101 while using browsing applications 108 on one or more electronic devices 102.

The user electronic device 102 also comprises a user electronic device display 105 configured to display various information to the user 101. It should be understood that when the user 101 and the electronic device 102 "visits" a website, the website's information is displayed on the user electronic device display 105 of the user electronic device 102.

Using the browsing application 108, the user 101 can visit websites of e-commerce platforms. By way of examples, an e-commerce platform 128 may be Yandex.Market™ e-commerce platform, Amazon™ e-commerce platform, and the like. The e-commerce platform 128 may sell the products, and/or may also refer the user 101 to websites of various organizations.

An organization 120 may be an online store, a booking service, online purchasing platform and/or a service provider that has an organization website selling merchandize or a service therefrom. An organization server 122 running the organization website is schematically illustrated in FIG. 1.

By way of examples, the organization website may be Beru.ru online store, Samsung™ online store, and the like. It should be understood, that the e-commerce platform may also have the same name as the organization 120 and/or may be the same entity as the organization 120. For example, the e-commerce platforms like Amazon™ e-commerce platform or www.bestbuy.com e-commerce platform sell their products directly (from their proper online store) and provide links to other selling organizations (such as, for example, www.batteries.com or www.batteriesexpert.com). The organization, as referred to herein, may also comprise the online store that is proper to the e-commerce platform (such as, for example, www.bestbuy.com or www.amazon.ca).

The user electronic device 102 has an electronic device identification (ID), which may also be referred to as a user device ID. While visiting the websites, the electronic device 102 provides the user device ID to the websites which may be registered by the hosting servers, such as organization servers 122.

Figure 2:
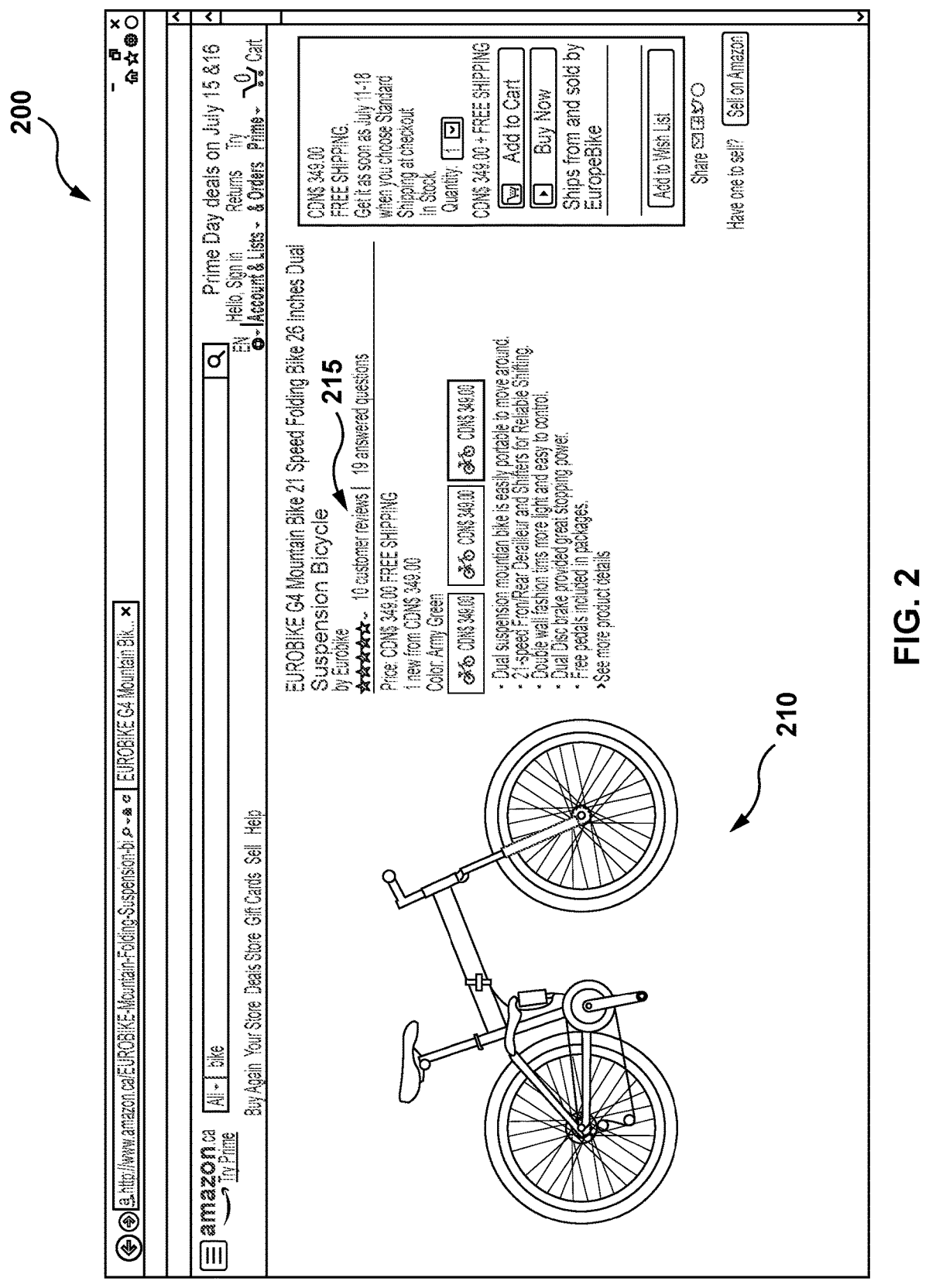

FIG. 2 depicts a non-limiting example of a screenshot of an e-commerce page 200 of the e-commerce platform 128 that may be displayed on the user electronic device display 105 when the user 101 accesses the e-commerce platform 128 from the user electronic device 102. It should be noted that how the e-commerce page 200 is implemented is not limited. By interacting with the e-commerce page 200, the user 101 may purchase online an item (such as a bike 210 illustrated in FIG. 2).

In some embodiments, the items (e.g. the bike 210) may be purchased directly from the e-commerce platform 128. In other embodiments, the items may be purchased from one or more organizations 120. For example, the e-commerce platform's website may host the description of the item, a list of organizations that sell that item, and links to those organizations. In response to activating a link (e.g. by a click) to the organization 120 on the e-commerce page 200, the e-commerce page 200 may redirect the browsing application 108 to the organization server 122 of the corresponding organization 120.

It should be noted, that after the user 101 has accessed the e-commerce page 200 displaying the item 210 and before receiving a transaction confirmation for the purchase, the user electronic device display 105 may, at any time, display other web page(s) from e-commerce website or other website(s).

Referring again to FIG. 1, the electronic device 102 comprises a communication interface (not depicted) for enabling two-way communication with a communication network 114 via a communication link 116. In some non-limiting embodiments of the present technology, the communication network 114 can be implemented as the Internet. In other embodiments of the present technology, the communication network 114 can be implemented differently, such as any wide-area communication network, local area communications network, a private communications network and the like.

How the communication link 116 is implemented is not particularly limited and depends on how the electronic device 102 is implemented. Merely as an example and not as a limitation, in those embodiments of the present technology where the electronic device 102 is implemented as a wireless communication device (such as a smart phone), the communication link 116 can be implemented as a wireless communication link (such as, but not limited to, a 3G communications network link, a 4G communications network link, a 5G communications network link, a Wireless Fidelity, or WiFi®, for short, Bluetooth®, or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementation details for the electronic device 102, the communication link 116, and the communication network 114. As such, by no means the examples provided herein above are meant to limit the scope of the present technology.

A user-generated recommendation platform 130 has a recommendation server 132. The recommendation server 132 may encompass one or more storage media, and generally provides a place to store computer-executable instructions executable by a recommendation processor 134. The recommendation server 132 has access to a recommendation database 136. For example, the recommendation database 136 may be implemented as a computer-readable storage medium including Read-Only Memory (ROM), hard disk drives (HDDs), solid-state drives (SSDs), and flash-memory cards.

The recommendation server 132, the organization server 122, and the databases as described herein are connected to the communication network 114 via the communication links 116.

The recommendation server 132 runs a recommendation website that is configured to provide an interface for users to provide reviews of various organizations 120.

Figure 3:
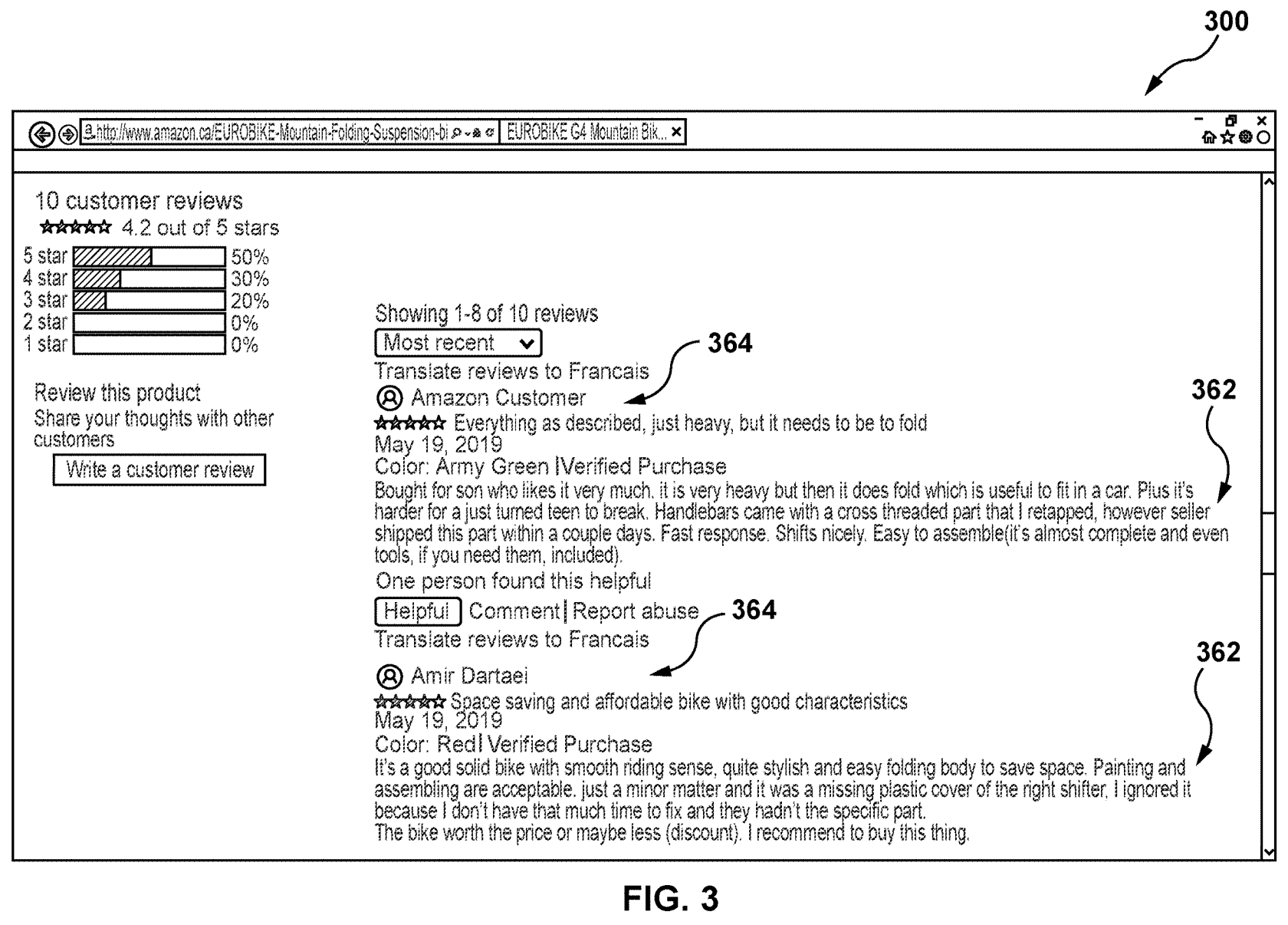

FIG. 3 depicts a non-limiting example of a screenshot of a reviews page 300, in accordance with at least one non-limiting embodiment of the present disclosure. The reviews page 300 may be displayed on the user electronic device display 105 when the user 101 accesses the recommendation server 132 from the user electronic device 102.

It should be noted that how the e-commerce page 200 and the reviews page 300 are implemented is not limited.

In at least one embodiment, the e-commerce page 200 and the reviews page 300 are related to each other. The reviews page 300 may be accessible from the e-commerce page 200, for example, by a click of a button, or the like. For example, the screenshot 200 depicted in FIG. 2 may be a landing page of the e-commerce website for the item 210. The e-commerce page 200 may have a link 215 which permits displaying, on the display 105 of the electronic device 102, the corresponding reviews page 300. It should be noted that the reviews page 300 may be a part of the landing page of the e-commerce website for the item 210 and clicking of the link 215 may simply result in scrolling of the landing page down in order to display the reviews of the item 210. In some embodiments, portions of the e-commerce page 200 and reviews page 300 may be displayed on the same page simultaneously.

In some embodiments, the recommendation website may be the same as the e-commerce website. In some embodiments, the users provide reviews about the services and/or goods directly on the e-commerce website. In some embodiments, the users may provide reviews about the services and/or items purchased directly from the corresponding e-commerce platform. In some other embodiments, the users may provide reviews about the services and/or items purchased from organizations 120, for example, to which the e-commerce website redirected the browsing application 108 of the electronic device 102.

The recommendation server 132 is configured to generate and periodically update the recommendation database 136 based on reviews and rankings provided by the user 101 (and other users potentially using the system 100) via the interface of the reviews page 300. Referring to FIGS. 1, 3, for each review, the recommendation database 136 may store an organization ID 360 of the organization 120, as well as a text of the review 362, including the ranking provided by the user 101. In addition, the recommendation database 136 may comprise such information as the corresponding user ID 364 and/or the electronic device ID 366 of the electronic device 102 from which the review 362 has been received. It should be noted that the review 362 may be the review of the organization and/or the review of the item 210.

The recommendation database 136 may also comprise a genuity mark 368 which may indicate whether the user who provided the review is a genuine customer or a fraudulent user.

A legitimate customer or, in other words, a "genuine customer" of the organization 120 provides a review based on his or her true experience with the corresponding organization 120, because the genuine customer has purchased merchandise or a service through the e-commerce platform 128 or the organization 120, or otherwise interacted with the organization 120. For example, the organization 120 may offer items or downloadable files (such, as, for example, music downloadable files) for free or other online interaction experience.

However, some users provide reviews while they are not genuine customers of the e-commerce platform 128 or the corresponding organization 120. The reviews of such users may be payed for by the organization 120 itself in order to improve the ranking of that organization 120 in the recommendation database 136. Alternatively, the organization's competitor may pay some users to provide negative reviews. Such illegitimate reviews distort the information on the recommendation platform 130 and need to be identified and discarded on a timely basis.

The system and the method as described herein are configured to identify whether the user 101 who provided the review is indeed the genuine customer, i.e. to identify whether he/she has purchased merchandize and/or services from the e-commerce platform 128 or the corresponding organization 120.

Referring again to FIG. 1, the system 100 includes a genuity confirmation server 140 coupled to the communication network 114. The genuity confirmation server 140 can be implemented as a computer server. In an example of an embodiment of the present technology, the genuity confirmation server 140 may be implemented as a Dell™ PowerEdge™ Server running the Microsoft™ Windows Server™ operating system. Needless to say, the genuity confirmation server 140 may be implemented in any other suitable hardware and/or software and/or firmware or a combination thereof. In the depicted non-limiting embodiment of the present technology, the genuity confirmation server 140 is a single server. In alternative non-limiting embodiments of the present technology, the functionality of the genuity confirmation server 140 may be distributed and may be implemented via multiple servers.

The genuity confirmation server 140 comprises a communication interface (not depicted) structured and configured to communicate with various entities (such as the electronic device 102 and other devices potentially coupled to the communication network 114) via the communication network 114.

The genuity confirmation server 140 also comprises a genuity confirmation server memory 142 which comprises one or more storage media and generally provides a place to store computer-executable program instructions executable by a genuity confirmation server processor 144. By way of example, the genuity confirmation server memory 142 may be implemented as a tangible computer-readable storage medium including Read-Only Memory (ROM) and/or Random-Access Memory (RAM). The genuity confirmation server memory 142 may also include one or more fixed storage devices in the form of, by way of example, hard disk drives (HDDs), solid-state drives (SSDs), and flash-memory cards.

In accordance with the non-limiting embodiments of the present technology, the genuity confirmation server 140 is configured to execute a genuity review confirmation application 146.

The genuity confirmation server 140 may be connected to the recommendation database 136 directly. In alternative embodiments, the recommendation database 136 may be communicatively coupled to the genuity confirmation server 140 via the communication network 114. Although the recommendation database 136 is illustrated schematically herein as a single entity, it is contemplated that the recommendation database 136 may be configured in a distributed manner.

When the genuine customer visits the organization's website and proceeds with a purchase, the user's browsing application 108 is usually directed to a transaction confirmation page (also referred to herein as a "genuity confirmation page").

Figure 4:
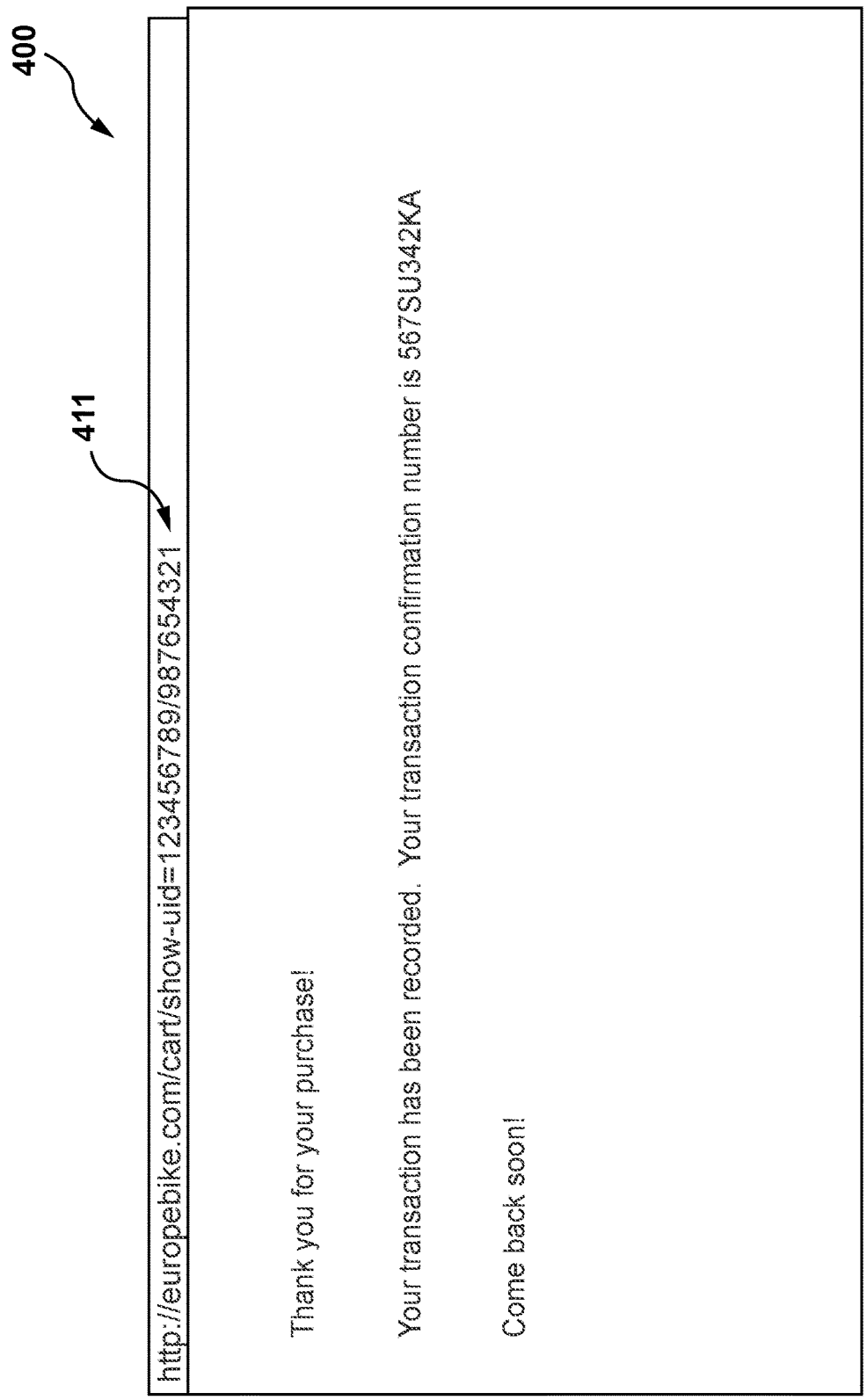
FIG. 4 schematically illustrates a non-limiting example of a transaction confirmation page, in accordance with at least one embodiment of the present technology.

FIG. 4 illustrates a non-limiting example of a transaction confirmation page 400, in accordance with at least one embodiment of the present technology.

In some web-design templates, the transaction confirmation page 400 may also be called "Thank you page". In at least one embodiment, the transaction confirmation page 400 is an online purchase confirmation page indicative of completion of a purchase by the genuine customer. The fact that the user 101 has proceeded with the purchase, and, therefore, is the genuine customer, may be confirmed if URL of such transaction confirmation page 400, i.e. a transaction confirmation page URL1 411, can be found in the user browsing history 110.

In order to identify whether a particular user is a fraudulent user or a genuine customer, the genuity confirmation server 140 is configured to verify whether the user browsing history 110 has a transaction confirmation page URL1 411. In order to recognize the transaction confirmation page URL1 411 in the user browsing history 110, the genuity confirmation server 140 needs to analyze the URLs stored in the user browsing history 110.

It should be noted that the purchase transaction may be processed by e-commerce platform 128 and/or the organization server 122. For example, the user browsing application 108 may display the e-commerce page 200 with information about the bike 210. As described above, the e-commerce page 200 may have links to various organizations that can sell the bike 210. In some embodiment, the e-commerce page 200 may provide a comparison of prices and/or reviews of the corresponding organizations 120, such as the reviews page 300. The user may follow one or more links provided on the e-commerce webpage 200 to access web pages of one or more organizations 120.

If the user purchases the bike 210 from the organization 120 (e.g. biking.ru online store or europebike.com online store), the browsing application 108 displays the transaction confirmation page 400. In this case, the browsing history 110 of the user electronic device 102 stores the transaction confirmation page URL 411. It should be noted that the transaction confirmation page URL 411 may have the domain name of the organization 120. In some embodiments, the transaction confirmation page URL 411 has the domain name different from the domain name of the corresponding organization 120 where the user 101 has purchased the item.

Alternatively, the user 101 may purchase the bike 210 directly from the e-commerce website and the transaction confirmation page URL 411 may have the domain name of the e-commerce website (e.g. "amazon.ca" domain name).

Figure 5:
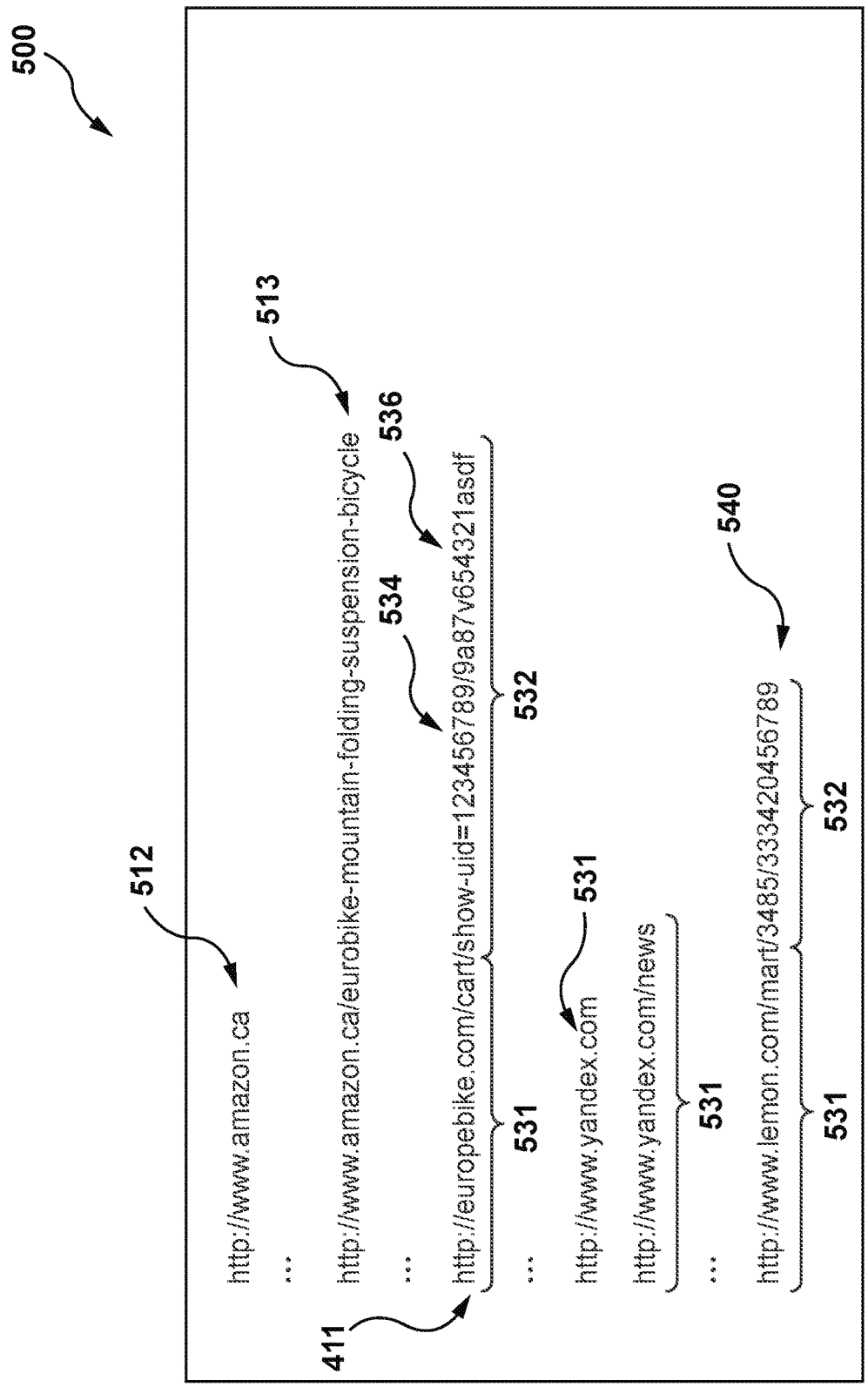
FIG. 5 illustrates a portion of a user browsing history of the user electronic device, in accordance with non-limiting embodiments of the present technology.

FIG. 5 illustrates a portion 500 of the user browsing history 110 of the user electronic device 102, in accordance with non-limiting embodiments of the present technology.

As illustrated in FIG. 5, the user browsing history 110 may have, among other URLs, the following URLs: URL2 512 ("https://www.amazon.ca/") and URL3 513 ("https://www.amazon.ca/EUROBIKE-mountain-folding-suspension-bicycle/dp/B0757J74FR/ref=sr_1_3_sspa?keywords=bike&qid=1562271743&s=gateway&sr=8-3-spons&psc=1" or simply "https://www.amazon.ca/eurobike-mountain-folding-suspension-bicycle").

If the transaction (for example, a purchase of the bike 210 from the online store europebike.com) was confirmed, and the transaction confirmation page 400 was displayed, the user browsing history 110 also comprises the URL of the transaction confirmation page 400: URL1 411 ("https://www.europebike.com/cart/show-uid=123456789/9a87v654321asdf").

The transaction confirmation page URL 411 represents the URL of the transaction confirmation page 400 to which the browsing application 108 of the electronic device 102 was redirected by the organization server 122 to confirm the purchasing transaction. If the transaction confirmation page URL1 411 is present in the user browsing history 110, the browsing application 108 displayed the transaction confirmation page 400 and this confirms that the user 101 purchased the bike 210 from the corresponding organization 120 (such as europebike.com online store in present non-limiting example).

Still referring to FIG. 5, in at least one embodiment, URLs 411, 512, 513 in the user browsing history 500, and, in particular, in the transaction confirmation page URL1 411, each has a static portion 531 and may have a dynamic portion 532 of the URL.

The static portion 531 of the URL comprises the web address of the organization, such as, for example <domain name> (e.g. "europebike.com" or "biking.com"). In some embodiments, the static portion 531 may also include other term that is static. For example, the static portion 531 may include terms such as, for example "market", "cart", "store", and/or "transaction", etc.

The dynamic portions 532 of the URL 411, 512, 513 may comprise the user ID 534 (such as "show-uid=123456789" in FIG. 5) and/or a transaction ID 536 (such as "9a87v654321asdf" in FIG. 5). In some embodiments, the user ID 534 may be included in the transaction ID 536. In some embodiments, the dynamic portion 532 comprises an ID of the purchased item, so that the dynamic portion 532 changes with the item purchased, as opposed to the domain name.

In some embodiments, the dynamic portion 532 of the URL may comprise a combination of the user ID and/or the transaction ID.

A mask, as referred to herein, is a sequence of symbols that represents a portion of the URL. Masks may be used in order to recognize similar URL patterns. In some embodiments, the genuity confirmation server 140 may associate the user ID with a user ID mask. The genuity confirmation server 140 may also associate the transaction ID with a transaction ID mask. The genuity confirmation server 140 may identify the masks, such as the user ID mask and/or the transaction ID mask, in the dynamic portion 532 of the URL 411.

A URL pattern, as referred to herein, is a sequence of strings that represent a URL. The URL pattern may comprise a combination of the domain name and/or the item ID of static portion 531 of the URL, the user ID mask and the transaction ID mask. A portion of the URL pattern that corresponds to the static portion of the URL may be referred to as a pattern static portion. The other portion of the URL pattern that corresponds to the dynamic portion of the URL and comprises one or more masks, such as the user ID mask and the transaction ID mask, may be referred to as a pattern dynamic portion.

The URL patterns of the transaction confirmation page URLs 411 of various organizations may be similar. Referring to FIG. 5, two transaction confirmation page URLs 411 and 540 of different organizations may have similar and recognizable URL patterns because the websites are created using the same template from content management systems (CMS). The URL patterns of the transaction confirmation pages may comprise similar user ID masks and/or transaction ID masks.

In some embodiments, the masks (such as, for example, user ID masks and/or transaction ID masks) may comprise symbols, such as, for example, special symbols (e.g. "?", #, etc.), that may represent with a mask code the corresponding portions of URL. For example, in such mask code, the question mark symbol "T" may represent one character. The star symbol "*" may represent a wild card (i.e. one or more symbols). The grid symbol # may represent one digit in the corresponding portion of the URL. It should be noted that other codes and encoding may be used to represent the symbols of the portions of the URL.

In a non-limiting example, URL1 411 in FIG. 5 is "https://www.europebike.com/cart/show-uid=123456789/ 9a87v654321asdf". The user ID is 123456789. Using the abovementioned mask code, the user ID mask may be, for example, "####*". The transaction ID is "9a87v654321asdf". Using the abovementioned mask code, the transaction ID mask may be, for example, "#?##?#####*". The URL pattern of URL1 411 in FIG. 5 is: <domain name>/cart/show-uid=<user ID mask>/<transaction ID mask>. Using the masks, the URL pattern of URL1 411 may be: "www.europebike.com/cart/show-uid=####/ #?##?#####*". The URL's pattern static portion of URL1 is <domain name>/cart. The URL's pattern dynamic portion of URL1 is "show-uid=####/#?##?#####*".

In at least one embodiment, the genuity confirmation server 140 is configured to generate embeddings corresponding to the URLs. In order to generate an embedding, the genuity confirmation server 140 may apply a Word2Vector algorithm to the URLs. For example, such URL may be URL1 411. In some embodiments, the genuity confirmation server 140 may apply the Word2Vector algorithm to the masks of the URLs to generate mask-based embeddings. The genuity confirmation server 140 may apply the Word2Vector algorithm to the URL pattern to generate URL pattern-based embeddings. The genuity confirmation server 140 may train a Neural Network based on the Word2Vec algorithm, such that the Neural Network generates vectors that are proximate in a multi-dimensional space when the associated URLs are similar (i.e. have similar URL patterns, for example) and vectors that are not proximate when the associated URLs are not similar.

In order to identify whether the user 101 has proceeded with the purchase and therefore the transaction confirmation page 400 has been displayed to the user on the electronic device 102, the embedding of a new (unconfirmed) URL may be determined and then compared to the embeddings that are known to correspond to the transaction confirmation pages of template organizations. As discussed above, the transaction confirmation page URLs for two different organizations, with the websites created using the template from CMS, may be similar. This may be determined by comparing the embeddings of these transaction confirmation page URLs.

Two embeddings may be considered similar when a difference between two embeddings is less than an embedding difference threshold. Similarly, one URL may be considered similar to a pattern of another URL (in other words, matching the pattern of the another URL) when a difference between the second URL and the pattern of the first URL is less than a pattern difference threshold. A portion of the URL may also be compared to a mask such that they are considered to be similar to each other (in other words, matching each other) when a difference between them is less than a mask difference threshold.

In some embodiments, the difference threshold (including the embedding difference threshold, the pattern difference threshold, and the mask difference threshold) may be, for example, ten percent variance. For example, the pattern difference threshold may correspond to matching 9 symbols out of 10. The exact value of the difference threshold can be selected based on the desired level of accuracy of the system 100.

Referring back to FIG. 1, the genuity confirmation server 140 is connected to a genuity database 150. The genuity database 150 comprises a list of template embeddings of template transaction confirmation page URLs of template organizations. The template organizations are organizations with known URLs of transaction confirmation pages. The transaction confirmation pages of the template organizations are generated using templates of CMS.

In some embodiments, to create the genuity database 150, the genuity confirmation server 140 may receive a plurality of template transaction confirmation URLs, such as, for example, URL1 411, of transaction confirmation pages of corresponding template organizations. For example, the genuity confirmation server 140 may receive template URLs of confirmation pages of Amazon™ marketplace, BestBuy-.com™ online store, etc.

In at least one embodiment, for each template URL of the plurality of template URLs of the transaction confirmation pages of the template organizations, the genuity confirmation server 140 is configured to generate a corresponding template embedding. The genuity confirmation server 140 then stores the generated template embedding of the template organization(s) in the genuity database 150.

Figure 6:
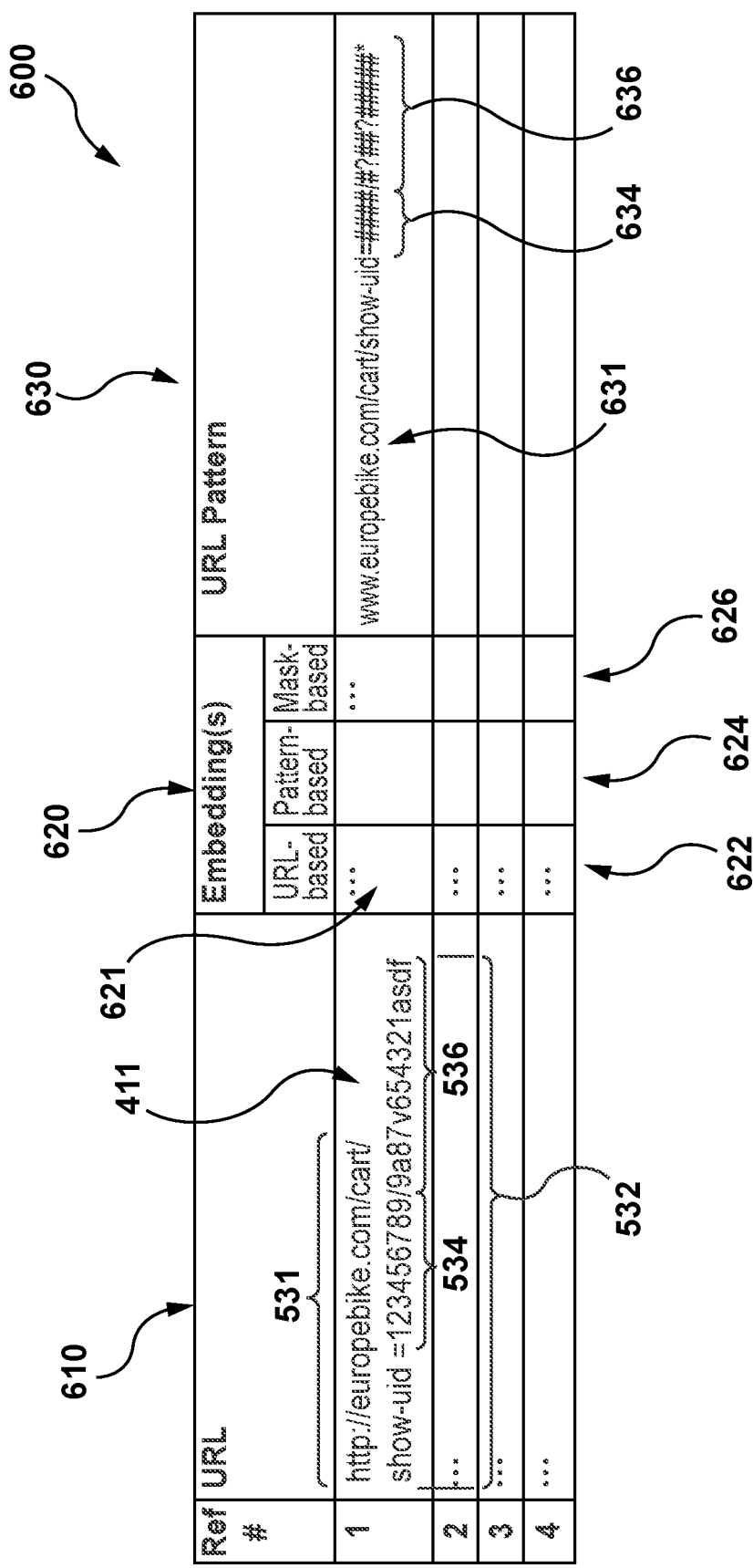
FIG. 6 depicts a schematic illustration of a non-limiting example of a portion of a genuity database, in accordance with non-limiting embodiments of the present technology.

FIG. 6 depicts a non-limiting example of a portion 600 of the genuity database 150, in accordance with non-limiting embodiments of the present technology. The genuity database 150 may comprise template transaction confirmation page URLs 610 and template embeddings 620 which correspond to the template transaction confirmation pages URLs 610.

The embeddings 620 may be URL-based embeddings 622, pattern-based embeddings 624 and/or mask-based embeddings 626 which may be determined based on the URL, URL pattern and/or masks, respectively.

As described above, the URL pattern 631 comprises a user ID mask 634 and a transaction ID mask 636 of the dynamic portion of the URL. Although the IDs themselves may be different for two URLs, the URL patterns 630 and/or the masks of the dynamic portions of the URLs of the transaction confirmation page URLs 610 may be similar.

Referring again to FIG. 1, the system 100 may also comprise a genuine customer database 170 which stores the organization IDs and the user IDs and/or electronic device IDs of genuine customers. After determining that the user 101 is the genuine customer of the specific organization, the system 100 may store the data in the genuine customer database 170. Such genuine customer database 170 may be consulted by the recommendation server 132 from time to time. It is also contemplated that the recommendation server 132 may perform such verification on-the-fly, without storing anything or consulting the genuine customer database 170.

Figure 7:
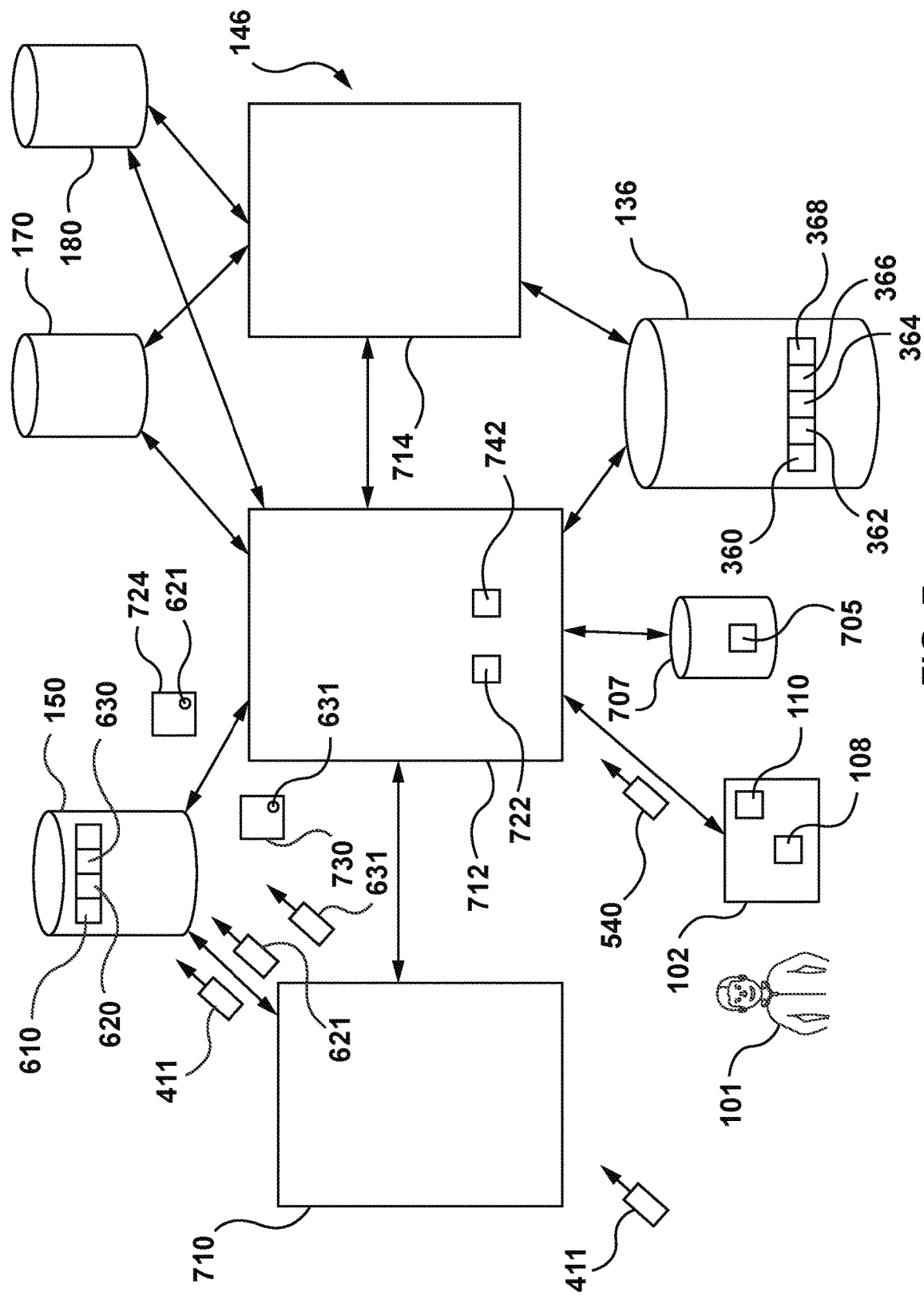
FIG. 7 depicts a schematic illustration of a genuity confirmation application and its interaction with databases of the system, in accordance with non-limiting embodiments of the present technology.

FIG. 7 depicts a schematic illustration of the genuity review confirmation application 146 and its interaction with databases of the system 100 and the user electronic device 102, implemented in accordance with non-limiting embodiments of the present technology.

The genuity review confirmation application 146 comprises a genuity database routine 710, a browsing history analysing routine 712, and a reviews managing routine 714. It is contemplated that other routines may be present in the genuity review confirmation application 146.

The genuity database routine 710 is configured to generate the genuity database 150. In at least one embodiment, the genuity database routine 710 receives a plurality of template transaction confirmation page URLs 610 of genuity confirmation pages of the corresponding template organizations. Then, for each template transaction confirmation page URL (e.g. transaction confirmation page URL 411), the genuity database routine 710 generates a template URL embedding 621 and stores it along with the other template URL embeddings 620 in the genuity database 150.

The genuity database routine 710 may generate the template URL patterns (e.g. template URL pattern 631) for the received template URLs 610 and store them in the genuity database 150 with user ID mask 634 and transaction ID mask 636.

The browsing history analysing routine 712 accesses the recommendation database 136 and finds an unconfirmed review 362 of one organization 120 received from an electronic device 102 with device ID 366. Such unconfirmed review has not been validated yet and it is not known whether the user 101 who provided such unconfirmed review 362 is a genuine customer of the organization 120 which has an organization ID 360. In other words, it is unknown whether the user 101 has purchased anything from the organization 120 for which he provided the review 362. For example, the recommendation database 136 may store a genuity mark 368. The genuity mark 368 may identify the corresponding review 362 as being, for example, "unconfirmed". For example, other reviews may have the genuity mark such as "confirmed genuine" or "confirmed fraudulent".

In some embodiments, for each user electronic device 102 and/or for each user 101 that provided his/her review 362 on the recommendation website and that is stored in the recommendation database 136, the browsing history analysing routine 712 analyses the user browsing history 110 of the electronic device corresponding to the device ID 366. It should be noted that one user 101, with the user ID stored in the recommendation database 136, may have browsing histories 110 on various user electronic devices, or online, as discussed above, and the browsing history analysing routine 712 may be configured to analyse such electronic devices consecutively or in parallel.

In some embodiments, a potential customers database 707 may store device IDs 705 of the electronic devices to be verified for genuity. The browsing history analysing routine 712 may access the potential customers database 707 and verify the electronic devices that correspond to the device IDs 705. In some embodiments, the potential customers database 707 may have stored the device IDs of the users that have already provided reviews. The recommendation server 132 may collect the device IDs of users who followed the link from the e-commerce platform to the corresponding organization's website.

For example, for an organization which is an online shop "www.lemon.com", the organization ID 360 may be "lemon.com" or "lemon". As described above, the recommendation database 136 may store the organization ID 360 (e.g. "lemon.com"), the user ID 364 of the user 101 who provided the review and/or the electronic device ID 366 from which the review was received by the recommendation database 136.

In some embodiments, the browsing history analysing routine 712 may request the user electronic device 102, corresponding to the electronic device ID 366 and/or the user ID 364, to provide at least partially the browsing history 110. In some embodiments, the browsing history analysing routine 712 may request to provide URLs of the user browsing history 110 from various electronic devices 102 which correspond to the user ID 364. The browsing history analysing routine 712 may determine whether or not the user browsing history 110 of the user electronic device 102 has URLs that are similar to the template URLs 610.

The browsing history analysing routine 712 is configured to receive, from the user electronic device 102, URLs stored in the user browsing history 110. For example, a new URL 540 (also referred to herein as a "first URL 540") may be received from the user electronic device 102. A non-limiting example of the new URL 540 is depicted in FIG. 5: "https://www.lemon.com/mart/3485/333420456789". The browsing history analysing routine 712 then analyses the new URL 540.

In at least one embodiment, in order to determine whether a newly received new URL 540 is a transaction confirmation page URL, browsing history analysing routine 712 is configured to generate a new embedding 722 of such new URL 540. This new embedding 722 is then compared with the template embeddings 620 of the genuity database 150.

At least a portion 724 of the template embeddings 620 may be retrieved from the genuity database 150 for comparison with the new embedding 722.

To compare the new embedding 722 to the template embedding 621, the browsing history analysing routine 712 determines a difference between the new embedding 722 and the corresponding (i.e. URL-based) template embeddings 621 received from the genuity database 150.

In some embodiments, if the browsing history analysing routine 712 determines that a difference between one of the template URL-based embeddings 724 and the new URL-based embedding 722 (also referred to herein as a "URL-based embedding difference") is less than the embedding difference threshold, then the electronic device 102 may be considered as a genuine customer's device.

If the URL-based embedding difference between each of the template URL-based embeddings 724 and the new URL-based embedding 722 is equal or higher than the embedding difference threshold, then the electronic device 102, from which the new URL 540 has been received, may be considered to be the electronic device of a fraudulent user.

In some embodiments, the browsing history analysing routine 712 may further analyze the new URL 540 to determine whether the new URL comprises a static portion that corresponds to an organization 120 that can be reviewed in the recommendation database 136.

In some embodiments, the browsing history analysing routine 712 may generate a new pattern 742 from the new URL 540. The new pattern 742 may be generated in the same form as the template patterns 630. For example, if the new URL is "https://www.lemon.com/mart/3485/333420456789", the new pattern 742 may be: <static portion of the new URL>/<user ID mask>/<transaction ID mask>, which may be ="www.lemon.com/mart/####/#############". In such new pattern 742, the static portion is "www.lemon.com/mart". The pattern dynamic portion of the new pattern 742 is "####/#############".

In some embodiments, to generate the new pattern 742, the browsing history analysing routine 712 may identify one or more masks of the new pattern 742, such as the user ID mask and/or the transaction ID mask. The user ID mask is "####", and the transaction ID mask is "#############".

After generating of the new pattern 742, the browsing history analysing routine 712 may compare pattern static portion of the new URL pattern 742 with template pattern static portions of the template patterns 630. As discussed above, the template patterns 630 are located in the genuity database 150.

In some embodiments, static portions of the new URL 540 may be compared directly with the template pattern static portions of the template patterns 630. It should be noted that the static portion of one URL, which corresponds to the domain name of that URL, and the pattern static portion of the URL pattern of the same URL, which also corresponds to the domain name of that URL, are related to each other. The static portion of the new URL 540 may be determined while the new pattern 742 is being generated.

The browsing history analysing routine 712 may thus determine whether the template patterns 630 have static portions similar to the new domain (e.g. "lemon.com") of the new URL 540. In some embodiments, the new pattern 742 may be compared with those template patterns that correspond to the template embeddings found to be similar to the new embedding 722.

In some embodiments, if no template pattern static portions of the template patterns 730 are similar to the pattern static portion of the new pattern 742, then the new URL pattern 742 may be added to the genuity database 150, along with the corresponding new embedding 722 and other data available for the new URL 540.

Based on the knowledge that the new embedding 722 is similar to at least one of template embeddings, the electronic device 102, from which the new URL 540 has been received, may be considered as the electronic device of the genuine customer. The first user electronic device may be marked as being a customer electronic device associated with the genuine customer of the corresponding organization (e.g. "lemon.com"). The corresponding organization's name may correspond to the domain name of the new URL 540. The review received from the customer electronic device regarding the corresponding organization may be displayed on displays of future customers' electronic devices.

Figure 8:
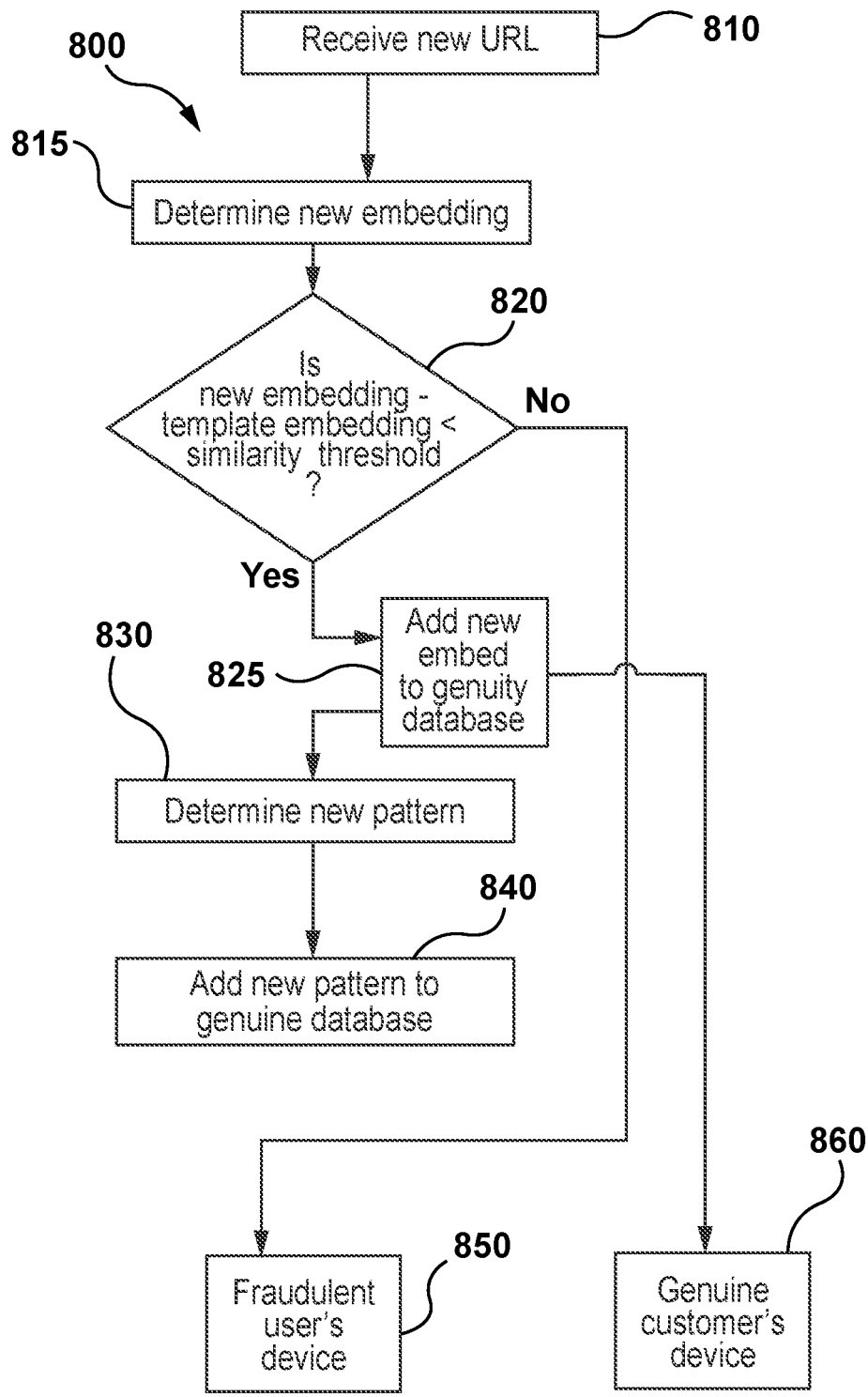
FIG. 8 depicts a block diagram of a flow chart of a computer-implemented method for identifying, among user electronic devices, customer electronic devices associated with genuine customers of organizations, in accordance with non-limiting embodiments of the present technology.

FIG. 8 depicts embodiments of a flow chart of a computer-implemented method 800 for identifying, among user electronic devices, customer electronic devices associated with genuine customers of organizations, in accordance with non-limiting embodiments of the present technology.

At step 810, the new URL 540 is received. At step 815, the new embedding 722 of the new URL 540 is determined. The system then verifies whether the new URL 540 belongs to the electronic device of a genuine customer or a fraudulent user who can potentially review or already reviewed a first organization.

At step 820, the new embedding 722 is compared to template embeddings 630 stored in genuity database 150. If there is no template embedding in the genuity database 150 such that the difference between the new embedding 722 and that template embedding is less than the embedding difference threshold, then the electronic device, from which the new URL has been received, may be considered as belonging to a fraudulent user (step 850).

If the difference between the new embedding and at least one the template embedding is less than the embedding difference threshold, the new embedding 722 is added to the genuity database 150 at step 825. The electronic device 102, from which the new URL 540 has been received, may be considered as belonging to the genuine customer at step 860.

The new pattern 742 corresponding to the new URL 540 may be generated at step 830. At step 840 the new pattern 742 may be added to the genuity database 150.

If, for one matching template embedding, the embedding difference is less than the embedding difference threshold, the browsing history analysing routine 712 may associate the new embedding 722 with a URL pattern associated with the corresponding (matching) template embedding.

In some embodiments, if the difference between the new URL-based embedding and the template URL-based embedding is lower than the embedding difference threshold, this may indicate that the new URL and the template URL have at least partially common URL pattern.

In some embodiments, the new embedding 722, once it is confirmed to correspond to a genuine transaction confirmation page, may be added to the genuity database 150. In some embodiments, when analyzing the browsing history 110, the browsing history analysing routine 712 may analyze only URLs that were used during a particular time period. For example, if the user 101 has provided a review 362 on a specific date and time, the browsing history analysing routine 712 may be configured to analyze only the URLs in the browsing history 110 that were saved or modified before the date and the time of the review.

If the differences between the embeddings of the URLs of the browsing history 110 are larger than the embedding difference threshold, then the user 101 who provided the review 362 may be considered as the fraudulent user.

After the browsing history analysing routine 712 has determined whether the electronic device 102 corresponds to a genuine customer or a fraudulent user, the reviews managing routine 714 of the genuity confirmation server 140 is configured to access and modify the recommendation database 136, the genuine customer database 170 and/or the fraudulent users database 180.

In at least one embodiment, the reviews managing routine 714 may mark the genuine customers' reviews as being genuine. For example, a textual mark or an image may be added to the recommendation database 136 to indicate to the readers of the recommendation website that it has been provided by the genuine customer. In at least one embodiment, in response to the difference between the unconfirmed embedding and the template embedding being lower than the embedding difference threshold, the reviews managing routine 714 may access the recommendation database 136 and mark comments associated with the corresponding organization and received from the first genuine customer electronic device 102 as being genuine comments. This may include modifying the genuity mark 368 in the recommendation database 136.

In some embodiments, the reviews managing routine 714 may add the user ID of the confirmed genuine customer of the corresponding organization to the genuine customer database 170.

In at least one embodiment, the reviews managing routine 714 may solicit a review by sending a comment request to the electronic device of the genuine customer. The comment request, which requests the user to provide comments, may be displayed on the display 105 of the user electronic device 102 of the genuine customer.

In some embodiments, the reviews managing routine 714 may discard a subset of reviews not associated with genuine customer electronic devices that are referenced or indicated in the genuine customer database 170.

If the browsing history analysing routine 712 has determined that the review 362 has been added by a user who is not the genuine customer, the reviews managing routine 714 may access the recommendation database 136 and mark as fraudulent the reviews that were received from that user. The reviews managing routine 714 may also delete the corresponding review 362 from the recommendation database 136. For example, the genuity mark 368 corresponding to the review 362 in the recommendation database 136 may be modified.

In some embodiments, the reviews provided from the non-genuine customer electronic device may also be used with a weight that decreases its influence or with a mark that indicates that these reviews are not verified or could be associated with non-genuine (fraudulent) users.

In some embodiments, the reviews managing routine 714 may access and discard reviews in the recommendation database 136 that were provided by the fraudulent user.

In some embodiments, if the browsing history analysing routine 712 has determined that the review 362 has been added by a user who is not a genuine customer, the reviews managing routine 714 may record the information about such fraudulent user to the fraudulent users database 180. Data that may be stored in the fraudulent users database 180 may include, for example, the user ID and/or one or more IDs of one or more electronic devices 102 that correspond to such fraudulent user.

Figure 9:
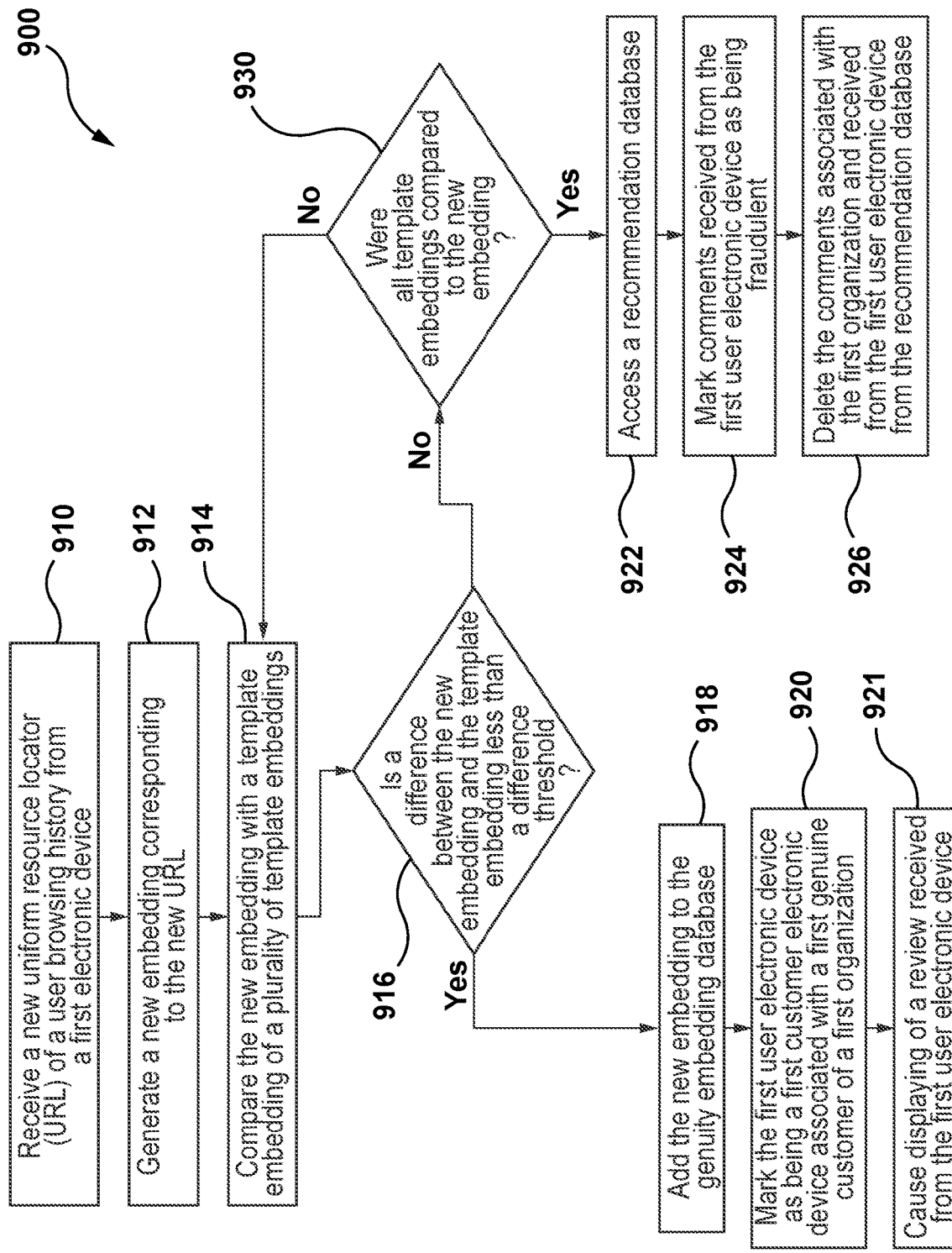
FIG. 9 depicts a block diagram of a flow chart of a computer-implemented method for identifying, among user electronic devices, customer electronic devices associated with genuine customers of organizations, in accordance with other non-limiting embodiments of the present technology.

FIG. 9 depicts a computer-implemented method for identifying, among user electronic devices, customer electronic devices associated with genuine customers of organizations, in accordance with non-limiting embodiments of the present technology. The method 900 is executed in the system described above by the genuity confirmation server 140 which communicates with the electronic devices 102 and servers and databases described herein.

At step 910, a new uniform resource locator (URL) 540 of a user browsing history 110 is received from a questionable user electronic device 102 by the genuity confirmation server 140.

At step 912, a new embedding 722 which corresponds to the new URL 540 is generated. In some embodiments, a new URL pattern may be also generated. To generate the new URL pattern, the genuity confirmation server 140 may identify a static portion 531 and a dynamic portion 532 of the new URL 540. The genuity confirmation server 140 may also identify a new mask 550 for the dynamic portion 532 of the new URL 540.

At step 914, the new embedding 722 is compared with a template embedding 724 of a plurality of template embeddings 620. In some embodiments, the plurality of template embeddings 620 may be retrieved from the genuity database 150.

At step 916, a difference between the new embedding 722 and the template embedding 724 is determined and compared with the embedding difference threshold.

If the determined difference between the new embedding 722 and the template embedding 724 is lower than the embedding difference threshold, the new embedding may be associated with a template URL pattern associated with the template embedding 724. At step 918, the new embedding 722 may be added to the genuity database 150. At step 920, the questionable user electronic device 102 is marked as being a new customer electronic device associated with the new genuine customer of the corresponding first organization.

At step 921, the genuity confirmation server 140 may cause displaying of a review received from the first user electronic device and corresponding to genuine customer on displays of the future customers' electronic devices.

If the difference between the new embedding 722 and the template embedding 724 is equal or higher than the embedding difference threshold, the system verifies if all template embeddings were compared to the new embedding at step 930. If all available template embeddings have been compared to the new embeddings, and none of the template embeddings has a difference with the new embedding that would be less than the embedding difference threshold, the recommendation database 136 is accessed at step 922. At step 924, the review associated with the corresponding first organization and received from the questionable user electronic device 102 may be marked as being fraudulent. At step 926, the review associated with the corresponding first organization and received from the questionable user electronic device 102 may be deleted from the recommendation database 136.

Figure 10:
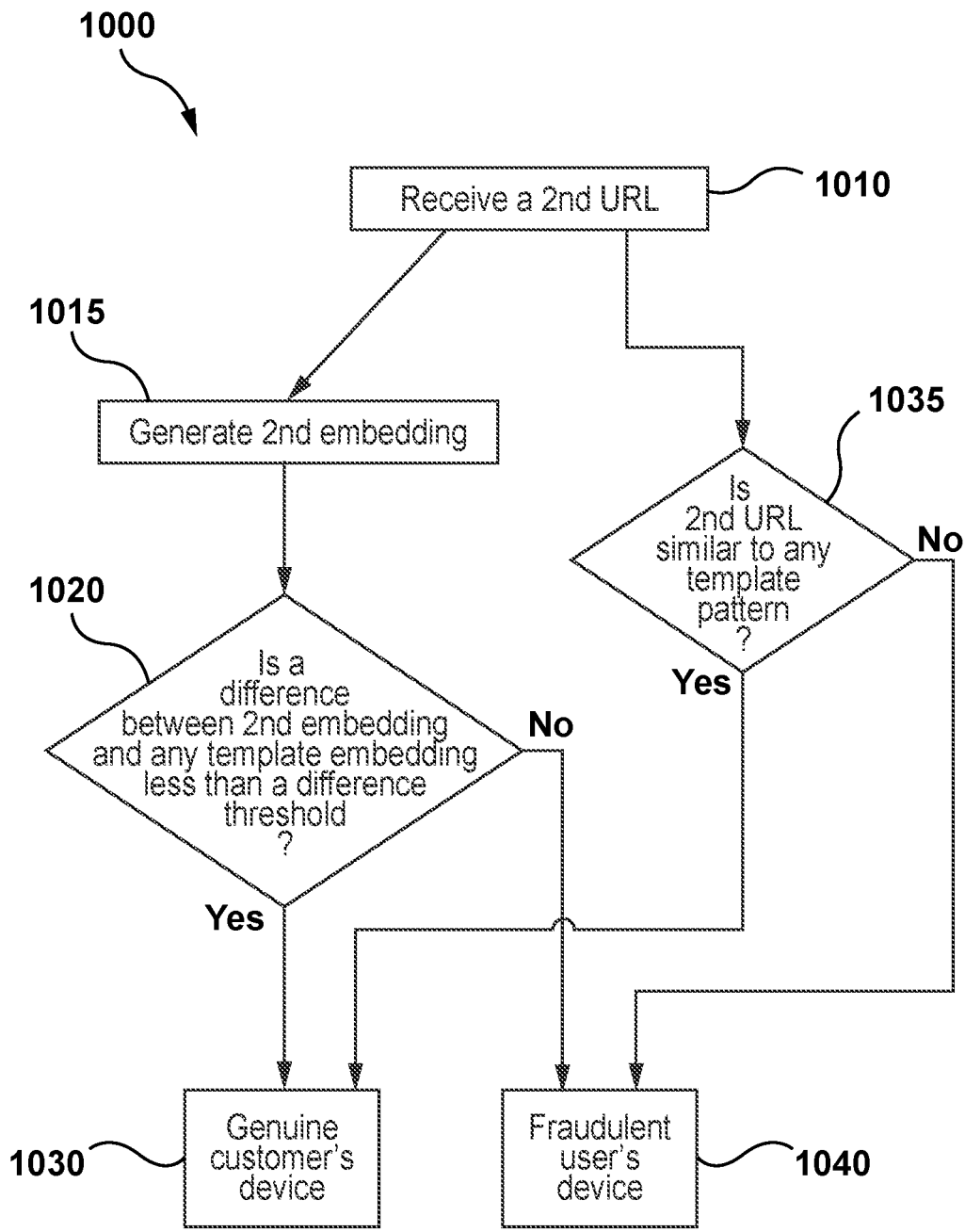
FIG. 10 depicts a block diagram of a flow chart of a computer-implemented method for identifying, among user electronic devices, customer electronic devices associated with genuine customers of organizations, in accordance with other non-limiting embodiments of the present technology.

FIG. 10 depicts another embodiment of a flow chart of a computer-implemented method for identifying, among user electronic devices, customer electronic devices associated with genuine customers of organizations, in accordance with non-limiting embodiments of the present technology.

At step 1010, another URL (also referred to herein as a second URL) may be received by the server. For example, the second URL may be received from another user electronic device (not shown) or the same user electronic device.

At step 1015, a second embedding of the second URL may be generated. At step 1020, the second embedding is compared to the new embedding discussed above and other template embeddings of the genuty database. If a difference between the second embedding and any of the template embeddings, including the new embedding 722 described above, is less than the embedding difference threshold, the electronic device, from which the second URL has been received, is considered to be a genuine customer device at step 1030.

If the difference between the second embedding and all of the template embeddings, including the new embedding 722 described above, is less than a difference threshold, is equal or higher than the embedding difference threshold, then the electronic device, from which the second URL has been received, is considered to be a fraudulent user's device at step 1040.

As an alternative to generating and analyzing the second embedding at steps 1015-1020, the system 100 may compare the second URL directly to the new URL pattern generated earlier and other template URL patterns of the genuity database 150 at step 1035.

If the second URL is similar to the new URL pattern, or any other URL pattern of the genuity database 150, then the electronic device from which the second URL has been received, is considered to be a genuine customer device. If the second URL does not match any of the template patterns, including the new URL pattern, then the electronic device, from which the second URL has been received, is considered to be a fraudulent user's device.

In some embodiments, a second static portion of the second URL and a second dynamic portion of the second URL may be identified. The second URL may be compared to the new URL pattern, that was previously stored in the genuity database 150.

If the second URL matches the new pattern 742, the second electronic device may be considered to belong to the genuine customer of the second organization. If the second URL does not match the first pattern, the second electronic device may be considered to belong to the fraudulent user. It should be noted that, in some embodiments, the second organization may be the same as the first organization.

It should be understood that, in at least one embodiment, the second URL matches the first pattern when the second dynamic portion of the second URL matches the first pattern dynamic portion. In at least one embodiment, the second dynamic portion of the second URL is compared the first pattern dynamic portion and to one or more masks of the first pattern dynamic portion. The second URL may be considered to match the first pattern when their difference is less than the pattern difference threshold which may be, for example, a ten percent variance or the like.

If the second electronic device has been determined to belong to the fraudulent user, the recommendation database may be accessed in order to mark the review associated with the first organization and received from the second user electronic device as being fraudulent. The second review associated with the first organization and received from the second user electronic device may be deleted from the recommendation database.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer-implemented method for identifying, among user electronic devices, customer electronic devices associated with genuine customers of organizations, the method being executed by a server, the method comprising:
   receiving, from a first user electronic device and by the server, a first review submission;
   determining a first user ID associated with the first user electronic device;
   determining a second user electronic device associated with the first user ID;
   sending, to the first user electronic device, a first request to provide a first browsing history stored on the first user electronic device;
   sending, to the second user electronic device, a second request to provide a second browsing history stored on the second user electronic device;
   receiving, from the first user electronic device, the first browsing history;
   receiving, from the second user electronic device, the second browsing history;
   selecting, from the first browsing history and the second browsing history, a first uniform resource locator (URL) corresponding to the first review submission;
   generating a first embedding corresponding to the first URL;
   comparing, by the server, the first embedding with a template embedding of a plurality of template embeddings, the plurality of template embeddings having been retrieved from a genuity database;
   in response to a difference between the first embedding and the template embedding being lower than an embedding difference threshold:
      adding the first embedding to the genuity database,
      determining a static portion and a dynamic portion of the first URL,
      generating, based on the static portion, a pattern-based embedding corresponding to the first URL,
      generating, based on the dynamic portion, a mask-based embedding corresponding to the first URL,
      storing the pattern-based embedding and the mask-based embedding in the genuity database in association with the first URL, and
      marking, by the server, all reviews associated with the first user ID, in a recommendation database, as having been provided by a genuine customer;
   receiving, by the server and from a third user electronic device associated with a second user ID, a second review submission;
   determining a second URL corresponding to the second review submission;
   generating a second embedding corresponding to the second URL;
   comparing, by the server, the second embedding with the template embedding; and
   after determining that a difference between the second embedding and the template embedding is greater than the embedding difference threshold:
      deleting, by the server and from the recommendation database, all reviews associated with the second user ID, and
      storing, in a fraudulent user database, the second user ID.

2. The method of claim 1, the method further comprising:
   in response to the difference between the first embedding and the template embedding being lower than the embedding difference threshold:
      marking the first user electronic device as associated with a first genuine customer of a first organization; and
      causing displaying of the first review submission on displays of future customers' electronic devices.

3. The method of claim 1, the method further comprising generating the genuity database by:
   receiving, by the server, a plurality of template transaction confirmation page URLs of genuity confirmation pages of corresponding template organizations; and
   for each template transaction confirmation page URL of the template transaction confirmation page URLs, generating a new template embedding and storing the new template embedding in the genuity database, the new template embedding being one of the plurality of template embeddings.

4. The method of claim 3, wherein at least one of the genuity confirmation pages is an online purchase confirmation page indicative of completion of a purchase by a genuine customer.

5. The method of claim 1, further comprising, in response to the difference between the first embedding and the template embedding being lower than the embedding difference threshold:
   associating the first embedding with a template URL pattern.

6. The method of claim 1, further comprising, in response to the difference between the first embedding and the template embedding being lower than the embedding difference threshold:
   generating a first URL pattern for the first URL; and
   adding the first URL pattern to the genuity database.

7. The method of claim 6, wherein the generating the first URL pattern comprises identifying a first dynamic portion of the first URL and a first static portion of the first URL.

8. The method of claim 7, wherein:
   the generating the first URL pattern comprises identifying at least one mask of a first pattern dynamic portion of the first URL pattern and identifying a first pattern static portion of the first URL pattern.

9. The method of claim 1, wherein the method further comprises:
   receiving, from a fourth user electronic device by the server, a third URL;
   generating a third embedding corresponding to the third URL;
   comparing the third embedding with the first embedding; and
   in response to a difference between the third embedding and the first embedding being lower than the embedding difference threshold:
      adding the third embedding to the genuity database.

10. The method of claim 1, wherein the difference between the first embedding and the template embedding being lower than the embedding difference threshold is indicative of the first URL and a template URL having at least a partially common URL pattern.

11. The method of claim 1, wherein the generating the first embedding comprises applying a Word2Vector algorithm to the first URL.

12. The method of claim 2 further comprising, in response to the difference between the first embedding and the template embedding being lower than the embedding difference threshold, and prior to causing displaying of the first review submission:
   sending a review request to the first user electronic device requesting to provide comments on the first organization, the review request being configured to be displayed on a display of the first user electronic device.

13. The method of claim 2, wherein the first organization is at least one of an online store, a booking service, and a service provider.

14. A computer-implemented system for identifying, among user electronic devices, customer electronic devices associated with genuine customers of organizations, the system comprising:
   a genuity database;
   a recommendation database; and
   a server configured to:
      receive, from a first user electronic device and by the server, a first review submission;
      determine a first user ID associated with the first user electronic device;
      determine a second user electronic device associated with the first user ID;
      send, to the first user electronic device, a first request to provide a first browsing history stored on the first user electronic device;
      send, to the second user electronic device, a second request to provide a second browsing history stored on the second user electronic device;
      receive, from the first user electronic device, the first browsing history;
      receive, from the second user electronic device, the second browsing history;
      select, from the first browsing history and the second browsing history, a first uniform resource locator (URL) corresponding to the first review submission;
      generate a first embedding corresponding to the first URL;
      compare the first embedding with a template embedding of a plurality of template embeddings, the plurality of template embeddings having been retrieved from a genuity database;
      in response to a difference between the first embedding and the template embedding being lower than an embedding difference threshold:
         add the first embedding to the genuity database,
         determine a static portion and a dynamic portion of the first URL, generate, based on the static portion, a pattern-based embedding corresponding to the first URL,
         generate, based on the dynamic portion, a mask-based embedding corresponding to the first URL,
         store the pattern-based embedding and the mask-based embedding in the genuity database in association with the first URL, and
         and
         mark all reviews associated with the first user ID, in the recommendation database, as having been provided by a genuine customer;
      receive, from a third user electronic device associated with a second user ID, a second review submission;
      determine a second URL corresponding to the second review submission;
      generate a second embedding corresponding to the second URL;
      compare the second embedding with the template embedding; and
      after determining that a difference between the second embedding and the template embedding is greater than the embedding difference threshold:
         delete, from the recommendation database, all reviews associated with the second user ID, and
         store, in a fraudulent user database, the second user ID.

* * * * *